(12) United States Patent
Heiser, II et al.

(10) Patent No.: US 10,614,459 B2
(45) Date of Patent: Apr. 7, 2020

(54) TARGETED MARKETING WITH CPE BUYDOWN

(75) Inventors: Russel Robert Heiser, II, Mogadore, OH (US); Nathan W. Shahan, Tallmadge, OH (US)

(73) Assignee: SEGMINT, INC., Akron, OH (US)

( * ) Notice: Subject to any disclaimer, the term of this patent is extended or adjusted under 35 U.S.C. 154(b) by 454 days.

(21) Appl. No.: 13/104,253

(22) Filed: May 10, 2011

(65) Prior Publication Data

US 2011/0276374 A1 Nov. 10, 2011

Related U.S. Application Data

(63) Continuation-in-part of application No. 11/865,466, filed on Oct. 1, 2007.

(60) Provisional application No. 61/332,933, filed on May 10, 2010, provisional application No. 60/849,156, filed on Oct. 2, 2006.

(51) Int. Cl.
*G06Q 20/38* (2012.01)
*G06Q 30/02* (2012.01)
*G06F 16/9535* (2019.01)

(52) U.S. Cl.
CPC ....... *G06Q 20/387* (2013.01); *G06F 16/9535* (2019.01); *G06Q 30/0211* (2013.01)

(58) Field of Classification Search
None
See application file for complete search history.

(56) References Cited

U.S. PATENT DOCUMENTS

| | | | |
|---|---|---|---|
| 5,319,542 | A | 6/1994 | King, Jr. et al. |
| 5,442,771 | A | 8/1995 | Filepp et al. |
| 5,446,891 | A | 8/1995 | Kaplan et al. |
| 5,642,485 | A | 6/1997 | Deaton et al. |
| 5,644,723 | A | 7/1997 | Deaton et al. |
| 5,649,114 | A | 7/1997 | Deaton et al. |

(Continued)

FOREIGN PATENT DOCUMENTS

| | | |
|---|---|---|
| CN | 101017554 A | 8/2007 |
| CN | 101226618 A | 7/2008 |

OTHER PUBLICATIONS

International Application No. PCT/US11/35850, PCT International Search Report, dated Jul. 11, 2011.

*Primary Examiner* — John Van Bramer
*Assistant Examiner* — Brendon Beheshti
(74) *Attorney, Agent, or Firm* — Fay Sharpe LLP

(57) ABSTRACT

When incentivizing vendors to give greater discounts on items or services offered or advertised to specific customers on a third-party website in exchange for reduced advertisement pricing, a vendor enters offer parameters (e.g., item or service for sale, price or discount amount, terms of the offer, a permitted number of acceptances of the offer, etc.) into a user interface along with target customer criteria (e.g., age, gender, minimum income, etc.). The target criteria is matched to customer profile data, and an advertisement generated using the offer parameter information is presented to customers whose profiles match the target criteria. In return for offering larger discounts, a cost per event (CPE) associated with the advertisement is reduced for the vendor. An invoice is generated and transmitted to the vendor, and upon receipt of payment, the advertisement provider remits a portion of the received payment to the website owner.

19 Claims, 14 Drawing Sheets

(56) References Cited

U.S. PATENT DOCUMENTS

| | | |
|---|---|---|
| 5,687,322 A | 11/1997 | Deaton et al. |
| 5,796,967 A | 8/1998 | Filepp et al. |
| 5,961,593 A | 10/1999 | Gabber et al. |
| 6,055,510 A | 4/2000 | Henrick et al. |
| 6,073,140 A | 6/2000 | Morgan et al. |
| 6,128,663 A | 10/2000 | Thomas |
| 6,216,129 B1 | 4/2001 | Elderig |
| 6,236,975 B1 | 5/2001 | Boe et al. |
| 6,266,649 B1 | 7/2001 | Linden et al. |
| 6,317,722 B1 | 11/2001 | Jacobi et al. |
| 6,330,543 B1 | 12/2001 | Kepecs |
| 6,424,949 B1 | 7/2002 | Deaton et al. |
| 6,519,571 B1 | 2/2003 | Guheen et al. |
| 6,523,041 B1 | 2/2003 | Morgan et al. |
| 6,560,578 B2 | 5/2003 | Eldering |
| 6,684,195 B1 | 1/2004 | Deaton et al. |
| 6,766,327 B2 | 7/2004 | Morgan, Jr. et al. |
| 7,062,510 B1 | 6/2006 | Eldering |
| 7,072,849 B1 | 7/2006 | Filepp et al. |
| 7,213,032 B2 | 5/2007 | Mascarenhas |
| 2001/0034651 A1 | 10/2001 | Marks et al. |
| 2001/0049620 A1 | 12/2001 | Blasko |
| 2002/0003162 A1 | 1/2002 | Ferber et al. |
| 2002/0019764 A1 | 2/2002 | Mascarenhas |
| 2002/0046341 A1 | 4/2002 | Kazaks et al. |
| 2002/0099605 A1 | 7/2002 | Weitzman et al. |
| 2002/0099824 A1* | 7/2002 | Bender .............. G06F 21/6254 709/225 |
| 2002/0111863 A1 | 8/2002 | Landesman |
| 2002/0188507 A1 | 12/2002 | Busche |
| 2002/0194058 A1 | 12/2002 | Eldering |
| 2003/0018613 A1* | 1/2003 | Oytac .................. G06Q 30/02 |
| 2003/0033199 A1 | 2/2003 | Coleman |
| 2003/0135460 A1* | 7/2003 | Talegon .............. G06Q 20/102 705/40 |
| 2003/0222134 A1 | 12/2003 | Boyd |
| 2004/0044627 A1 | 3/2004 | Russell et al. |
| 2004/0172343 A1 | 9/2004 | Allibhoy et al. |
| 2004/0267611 A1* | 12/2004 | Hoerenz ........... G06Q 10/0637 705/14.13 |
| 2005/0038699 A1 | 2/2005 | Lillibridge et al. |
| 2005/0060227 A1* | 3/2005 | Nelson ................ G06Q 30/02 705/14.1 |
| 2005/0131758 A1 | 6/2005 | Desikan et al. |
| 2006/0004628 A1 | 1/2006 | Axe et al. |
| 2006/0074769 A1 | 4/2006 | Looney et al. |
| 2006/0080238 A1 | 4/2006 | Nielsen et al. |
| 2006/0161599 A1 | 7/2006 | Rosen |
| 2006/0178935 A1 | 8/2006 | Barton et al. |
| 2006/0178986 A1 | 8/2006 | Giordano et al. |
| 2006/0242013 A1 | 10/2006 | Agarwal et al. |
| 2006/0287919 A1 | 12/2006 | Rubens et al. |
| 2007/0067297 A1 | 3/2007 | Kublickis |
| 2007/0124425 A1 | 5/2007 | Gross |
| 2008/0004884 A1 | 1/2008 | Flake et al. |
| 2008/0005313 A1 | 1/2008 | Flake et al. |
| 2008/0010206 A1 | 1/2008 | Coleman |
| 2008/0086365 A1 | 4/2008 | Zollino et al. |

\* cited by examiner

TARGETED MARKETING WITH CPE BUYDOWN

CROSS-REFERENCE TO RELATED APPLICATIONS

This application is a continuation-in-part (CIP) of, and claims priority to, U.S. patent application Ser. No. 11/865,466 filed on Oct. 1, 2007 and entitled Personalized Consumer Advertising Placement, which claims priority to U.S. Provisional Patent Application Ser. No. 60/849,156 filed on Oct. 2, 2006 and entitled Personalized Consumer Advertising Placement, all of which are incorporated by reference herein. This application also claims priority to U.S. Provisional Application No. 61/332,933, filed on May 10, 2010.

BACKGROUND

The subject application relates to targeted advertising systems and methods. While the systems and methods described herein relate to targeted advertising and the like, it will be appreciated that the described techniques may find application in other advertising systems, other advertising pricing applications, and/or other advertisement placement and pricing methods.

Advertisers are constantly searching for more efficient means to allow their products/services to be advertised to consumers who have a need for their products/services or who are currently spending money on similar products/services with a competitor. In essence, advertisers are constantly faced with finding the consumer who is "ready" to purchase their products/services, "able" to complete the purchase of their products/services, and "willing" to purchase the products/services immediately ("RAW"). With the advent of newer technologies such as Digital Video Recorders (DVRs) and On Demand TV, advertisers fear the loss of traditional means of advertising to consumers.

Current options for electronic web based advertising are very costly and yield limited results. To reach an acceptable number of consumers to advertise their products/services advertisers must run campaigns, which reach masses of people but only yield single digit return in consumer interest and purchases. For example out of 100 consumers who see an advertiser's campaign/ad, only 3-5 may be RAW. Despite their best efforts, current consumer advertising methods remain very costly and yield a minimal return for the amount of investment.

One problem with present online advertising is called a shotgun approach. In this approach, an advertiser/marketer buys a word that is typed into an internet search engine. When purchasing this word or phrase the marketer/advertiser is thinking, "based on this word I think that xx % might be interested in my product". The problem is those words are very expensive. Internet advertisers are getting market rates such as between $5.00 and $10.00 per word per click to have a good placement on a web site per a single word or two word phrase. Moreover, the marketer/advertiser does not know whether the consumer who views their advertisement is RAW.

Marketers have been able to develop ways to maintain customers once they have initiated purchases via tracking of the consumers purchasing habits and trends. Special loyalty programs have been developed such as reward coupons and other incentives based on the amount, frequency, and trends of the consumers purchases. Other advertisers/on-line retailers such as Amazon.com profile the customers who actually visit their site. With Amazon, the consumer is profiled by the products they view and what they purchase while on the site. Amazon then tracks the consumer's habits of shopping and what they purchased so that when the consumer signs in at another time advertisements will immediately pop up with "suggested items" for the consumer to consider purchasing based on their previous actions and purchases with Amazon only. While these approaches are effective in maintaining already existing customers and motivating the consumer to purchase additional items, they fall short in their ability to secure additional customers from competitors who offer similar products/services. The current advertising methodologies are still unable to track actual consumer spending and trends outside of an already existing customer, i.e. based on a broad spectrum of actual financial transactions within the consumer's financial institution(s).

To make their advertising dollars more effective, advertisers attempt to target their advertising to individuals who are more likely to have an interest in the advertised product, thereby producing a higher click-through rate and increased revenues. Of course, in order to target individuals with any degree of accuracy, something must be known about the individual. For this reason, technologies have been developed for what is known in the art as behavioral targeting based on tracking a user's habits through monitoring of the websites that the user visits, and offering targeted advertising based on the content of the visited websites. It is assumed, for example, that if a user is visiting automobile oriented websites, then an automobile oriented advertisement is more likely to generate a user response than one for breakfast cereal. A problem with this type of website tracking is that if an automobile advertisement for a very expensive car is delivered to a user and he cannot afford to purchase the automobile, then the advertisement is not very effective.

Additionally, traditional cost structures for internet-based advertisement placement include rigid pricing arrangements, such as a set cost per advertisement placed, clicked-on, and so forth. However, targeted marketing methods that employ such pricing arrangements are only designed to increase the quality of the customers to whom the advertisement is presented, but do little to encourage a vendor or the website owner to increase a benefit passed on to these customers.

Accordingly, there is an unmet need for systems and/or methods that facilitate incentivizing vendors and website owners alike to provide larger discounts for customers of the website on which the vendors' advertisements are presented, and the like, while overcoming the aforementioned deficiencies.

BRIEF DESCRIPTION

Consumers are identified with their actual consumer financial expenditures so that they can be mined and sorted within a database according to specific advertising/ad criteria provided by marketers, advertisers, ad agencies, and other applicable organizations to match a desired consumer profile with consumers of such a profile. The subject personalized consumer advertising/ad placement system provides the ability for marketers, advertisers, ad agencies, and any other applicable organization to determine and electronically present their "ideal" consumer profile, or market segment, and have their advertisement/promotion placed in front of all consumers who match the profile based on the mining of the consumers actual spending across a broad base of financial transactions and other non-personal information. The ability to allow any advertisers/ad agencies regardless of business or specific merchant focus, the ability to "create" a "custom" profile for specific consumers within a certain market, within a geographical location, with a certain monthly income from the consumer's actual financial transactions within their financial institution(s) would be advantageous and unique compared to any technologies on the market today.

By way of introduction only, a personalized consumer advertising/ad architecture/solution may include the presentation of personal and targeted advertisements/promotions prepared by an advertiser, ad agency, or any other applicable organization, transferred electronically to a web site entered by the consumer for electronic review and response.

An embodiment of the personalized consumer advertising/ad architecture/solution enables non-personal consumer transaction data to be transferred electronically from any financial institution to an advertisement delivery provider's database. This financial data can consist of checking account transactions, credit card transactions, and loan information as well as any other purchase or financial transactions that may pertain.

The advertisement delivery provider will house all transactional data in its secure, industry compliant database (software and hardware). Each set of consumer transactions will be provided a key number by the financial institution as the data is passed to the advertisement deliver provider's database. This key number will be maintained by the financial institution to enable the mined data with the corresponding ads/promotions from the advertisers to be married back together with the consumer for placement on the consumer's computer after mining.

The advertisement delivery providers will interact with outside marketers, advertisers, ad agencies and other applicable organizations to secure their individual consumer advertising profiles for specific products/services to be advertised to consumers. The marketer, advertiser, ad agency, or other organizations will be able to provide the exact target consumer they would like to view their ad/promotion. An example might be a home improvement store which might establish a profile with the advertisement delivery providers to place a specific ad/promotion in front of all consumers within 20 miles of Cleveland, having spent over $500 in the past 6 months on home improvements, who engages in transactions with Lowes, Sears, Ace Hardware, and TrueValue, and who have a total income of over $8,000 per month. The advertisement delivery provider would then mine its database containing all of the financial transactions from multiple financial institutions only identifying those consumer accounts, which fit these specific criteria.

Pricing for the data mining provided by the advertisement delivery provider will vary based on the number of levels of segmentation the marketer, advertiser, ad agency, and other organizations may specify. The more targeted the consumer audience requested by an advertising organization, the more the cost to have the ad displayed will escalate. An example of costs would be the home improvement scenario used above. There were four levels of criteria specified and each level cost $1.00, thus the total cost would be $4.00 to the advertiser for every ad opened by the targeted consumer. Also, the pricing can be determined as whether an advertisement has simply been displayed, or whether an advertisement has been displayed and clicked.

Through the use of the personalized consumer advertising/ad architecture/solution, consumers will be able to see new promotions and ads every time they sign in to their on-line financial institution web account as well as when they surf to web sites not affiliated with a financial institution. Consumers can be flagged unobtrusively as they enter these sites as to how many new ads/promotions have been provided to them since their last sign in.

The advantage of the personalized consumer advertising/ad architecture/solution is that only ads/promotions appearing for the consumer can be for services/products they are currently spending their money on, or have an immediate interest in, across all categories of purchase. Consumers may receive ads/promotions, which have discounts at retail stores, restaurant coupons, special promotions and rebates on automobiles etc. to name a few of the types of ads/promotions.

A second advantage of the invention is the ability for the advertisement delivery provider to create an electronic bridge from the financial institution to the advertiser for the benefit of the consumer. The financial institution can now provide an additional service offering by placing ads, promotions, and coupons directly in front of a consumer for not only the things they have interest in but in addition are purchasing currently.

A third advantage is that the consumer remains anonymous to the advertiser, despite seemingly having a direct communication from the advertiser upon the consumer's signing on to the financial institution's web site. If the consumer chooses to ignore the advertisement (no click) then the advertisement may expire after a selected time-out or upon the completion of the advertising campaign.

The foregoing summary is provided only by way of introduction. All features, benefits, and advantages of the personalized consumer advertising/ad architecture/solution may be realized and obtained by instrumentalities and combinations particularly pointed out in the claims. Nothing in this section should be taken as a limitation on the claims, which define the scope of the invention.

The subject development is also applicable to the other entities or financial institutions who maintain personalized web sites in association with customers' financial data, such as insurers, investment counselors, brokers or the like.

In accordance with various aspects described herein, systems and methods are described that facilitate presenting targeted online advertisements to pre-screened, qualified customers using a scalable price structure for advertisement placement. According to one aspect, a method of presenting targeted advertisements to qualified customers while providing a scalable, discount-dependent cost structure to a vendor placing the advertisements comprises receiving offer parameters from a vendor, and accessing a cost-per-event (CPE) lookup table (LUT) that includes pricing information for each instance of a predefined event associated with an advertisement according to the offer parameters. The method further comprises identifying qualified customers by matching key lifestyle indicators (KLIs) in an anonymized customer profile to target customer KLIs specified by the vendor in the offer parameters, and presenting the advertisement to qualified customers when the qualified customers log on to a predetermined website. Additionally, the method comprises tallying the number of advertisement-associated events that occur within a predetermined time period, and periodically generating an invoice comprising the tally of events, the CPE for the events, and a total cost of the advertisements. The CPE for the events is adjustable as a function of the size of a discount (e.g., 15%, 20%, etc.) or offer (e.g., a $50 gift card, a $75 gift card upon purchase of a 2-night stay, etc.) presented in the advertisement and specified by the vendor in the offer parameters.

According to another feature described herein, a system that facilitates presenting targeted advertisements to qualified customers while providing a scalable, discount-dependent cost structure to a vendor placing the advertisements comprises a server that is coupled to each of a vendor user interface (UI), a third party website, and a customer user interface, and which includes a processor that executes, and a memory that stores, computer executable instructions. The instructions include receiving offer parameters from a vendor user interface (UI), the offer parameters including information related to an offer to be presented on the third party website, and generating an advertisement describing the offer based on the offer parameters. The instructions further include matching customer profile key lifestyle indicators (KLIs) to target customer criteria specified in the offer parameters to identify qualified customers, and presenting the advertisement on the third party website to the qualified customers when the qualified customers log on to the third party website. The instructions further include tallying a number of advertisement events that occur within a predetermined time period, determining a cost per event (CPE) related to advertisement presentations for the advertisement by performing a table lookup on a CPE lookup table (LUT) that correlates CPEs to discount values, and generating an invoice for the vendor that describes the tally of events for the advertisement, the CPE for the advertisement, and a total cost for the advertisement. The CPE is adjustable as a function of the size of a discount offered by the vendor for an item or service described in the offer parameters.

The foregoing summary is provided only by way of introduction. All features, benefits, and advantages of the personalized consumer content architecture/solution may be realized and obtained by instrumentalities and combinations particularly pointed out in the claims. Nothing in this section should be taken as a limitation on the claims, which define the scope of the invention.

DETAILED DESCRIPTION

Figure 1:
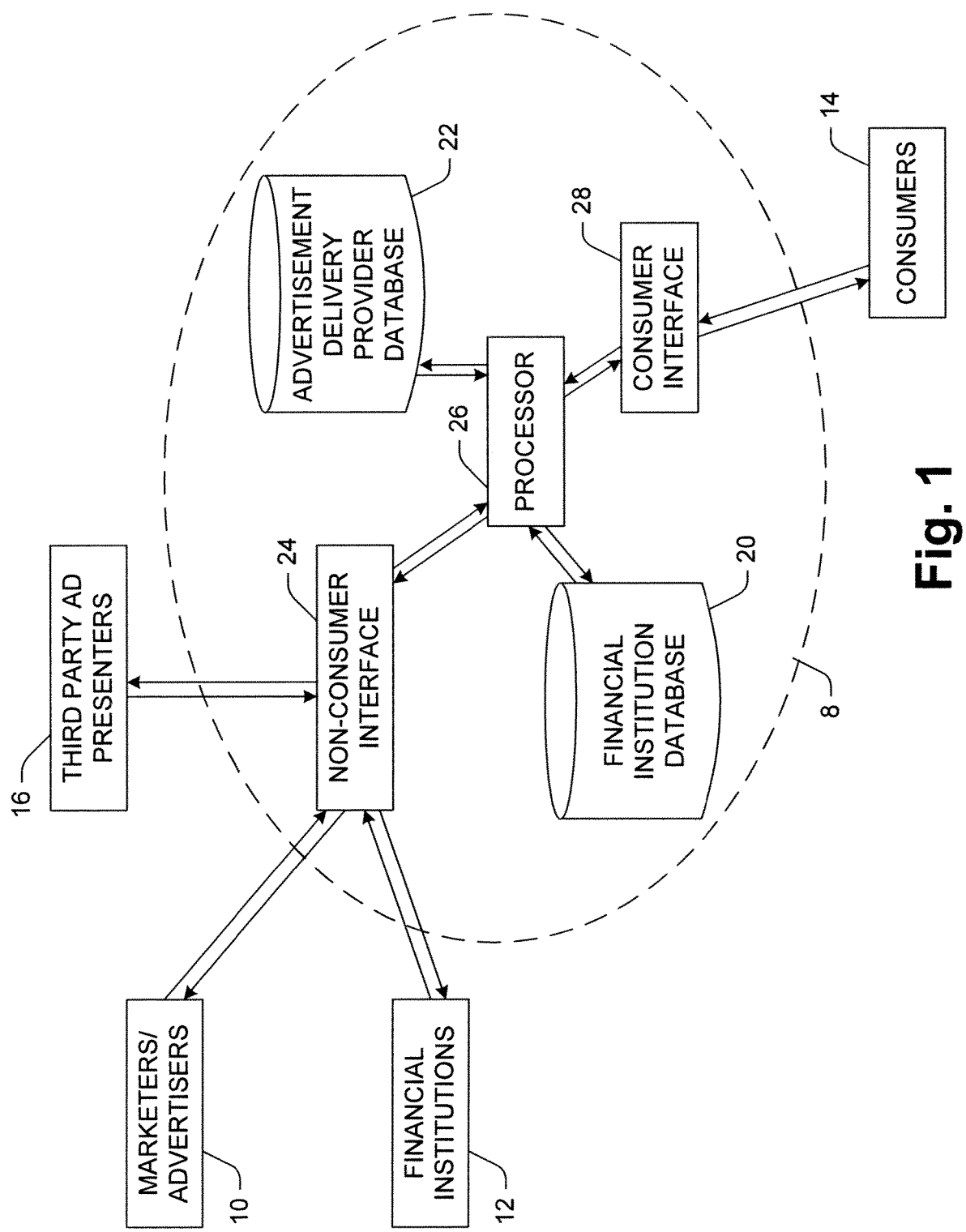
FIG. 1 is a block diagram depicting a system for selectively delivering advertisements.

The following is a description of a system and a method for delivering targeted advertisements to consumers over a network, such as the Internet or similar integrated network. An example of such a system will be described so that one can make the system; however, the embodiments, which are defined by the appended claims, are not limited to only the system described below. With reference to FIG. 1, the system 8 allows for communication among the following individuals or entities: marketers 10, financial institutions 12 and consumers 14. The system can also allow companies or entities that are not financial institutions to allow for the delivery of advertisements on their web sites or other communication platform—these entities will be referred to as third party advertisement presenters 16.

The marketers 10 are companies or individuals who wish to deliver an advertisement to the consumers 14. More particularly, the system allows marketers 10 to deliver advertisements to consumers who are ready, able and willing (RAW) to buy the products or services offered by the marketer. The consumers 14 are also customers of at least one of the financial institutions that share information within the system. The financial transactional history of the consumers, which is provided by the financial institutions, is used to define a market segment that will receive targeted advertisements over the network. The financial institutions 12 can include banks, savings and loans, credit unions, retailers and the like. The third party advertisement presenters 16 operate web sites that are not affiliated with the any of the financial institutions (or are unsecure web sites that are operated by the financial institutions) that allow for the delivery of advertisements. The system is designed to maintain the anonymity of the consumers while allowing the marketers to have their advertisements delivered to consumers who fall within their defined market segment.

Generally the system includes a secure database 20 (or a plurality of secure databases) that is/are operated by the financial institutions 12. The financial institution secure database 20 stores, or warehouses, the financial transactions (and other financial information) of the customers of the financial institution along with other non-financial information. These financial transactions can include the debits and credits of the customers of the bank, the loans that are held by the bank for that customer, credit/debit card transactions and the like. The other information about the customer that is stored in the financial information secure database 20 includes information such as the identity of the customer, the age and sex of the customer and the home zip code of the customer. This customer information is associated with a unique customer identification code (UCIC) that associates the customer to the information while still maintaining the anonymity of the customer. By anonymity is meant that the information communicated to the advertising delivery provider precludes the provider from knowing who the consumer really is so that the "cookie" presented to the consumer is anonymous. Accordingly, the UCIC can be referred to as an anonymous coding. For example, the UCIC is not based on the name, address or social security number of the customer, which could lead to the identity of the customer becoming known. The UCIC is tied to the financial transactions of the customer, the age and sex of the customer, and the zip code of the customer; however, more personal information, such as the social security number, phone number, credit card numbers and the name of the customer, is not associated with the UCIC, thus protecting the identity of the customer.

The system also includes a secure database 22 that is operated by advertisement delivery provider. This database 22 associates the UCIC with the information that is similar to that stored in the financial institutions databases. The advertisement delivery provider database 22 stores, or warehouses, the financial information and other non-personal information that it receives from a number of different financial institutions. The advertisement delivery provider database 22 also associates an advertisement delivery identification code (ADIC) and a financial institution identification code (FIIDC) for each individual customer stored in its database and associates these codes with the UCIC that is provided by the financial institution database. The ADIC is unique to each customer stored in the database. The FIIDC is associated with the financial institution that has the provided the customer information for the unique customer. Since the UCIC maintains the anonymity of the consumer to which it is matched, the ADIC and the FIIDC also maintain that anonymity of the consumer because no personal information is matched to these codes. Accordingly, the UCIC and the FIIDC can also be referred to as anonymous codings.

The system 8 also includes a first interface 24, or portal, which will be referred to as a non-consumer portal, that allows marketers 10, financial institutions 12 and third party advertisement presenters 16 to communicate with the advertisement delivery provider database through a processor 26, which runs system software and is operated by the advertisement delivery provider. The system further includes a second interface 28, which will be referred to as a consumer portal, through which consumers 14 will receive targeted advertisements based on non-personal information that is known about the individual consumer who has logged onto the consumer portal 28.

Generally, the method for delivering targeted advertisements to consumers includes a marketer 10 defining a market segment, a financial institution 12 providing a base of customers from which the market segment can be drawn, and an entity (the advertisement delivery provider) that delivers advertisements to consumers that are within the defined market segment. A market segment is group of people or entities that share one or more characteristics that cause them to have similar product needs. A method for delivering targeted advertisements to consumers will be described in detail so that one skilled in the art can practice the method; however, the order in which the steps of the method are practiced can deviate from the order in which they are depicted in the FIGURES.

Figure 2:
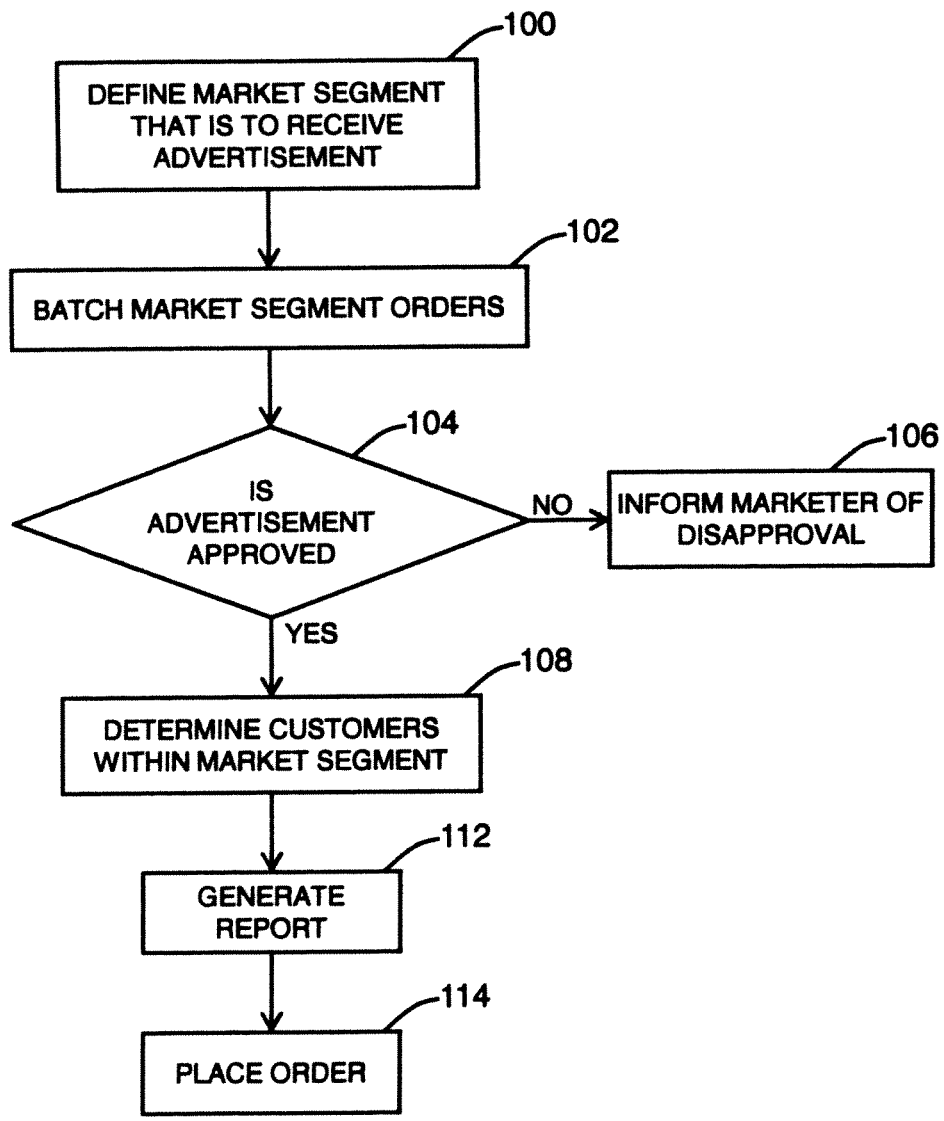
FIG. 2 is a flow diagram depicting a process for ordering an advertisement to be delivered to a consumer.

FIG. 2 depicts steps that can be carried out by the marketer to deliver targeted advertisements to consumers. The marketer is the entity that desires to sell a product or a service and therefore wishes to advertise its products or services. The marketer can also simply wish to deliver advertisements to a market segment and not be in the business of selling a product or service, e.g. a charitable organization. At 100 the marketer defines a market segment that is to receive an advertisement. Prior to defining the market segment, the marketer will typically have developed an advertisement that it would like to deliver to a consumer who is within the defined market segment. For example, a marketer desiring to sell sport cars may define the market segment to be females who have a monthly car payment of over $450. The market segment could be narrowed, for example to where a consumer lives, the number of car payments that the consumer may have left on a car loan or lease, the monthly deposits made into the consumer's checking or savings account and other information that may be relevant in determining whether the consumer is in the market for a sports car. As will be described with more detail with reference to FIGS. 3 and 4, the market segment can be defined solely by the marketer or the market segment can be defined with the aid of software utilized within system.

With continued reference to FIG. 1, at 100 the market segment is defined by the marketer filling out an order screen, which in the depicted system embodiment is a web portal (non-consumer portal 24 in FIG. 1) that is operating the software that facilitates defining the market segment. Financial institution customers that fall within the market segment comprise the group of consumers who will receive the targeted advertisement of the marketer, which in the example described above is an advertisement for a sports car.

At 102, market segment order data is batched with other market segment order data that has been received from other marketers or with market segment order data that has been received from the same marketer requesting advertisements be delivered to a different market segment. The market segment data is batched in the advertisement delivery provider database 22 (FIG. 1).

At 104, the site (or sites) that is/are to present the advertisement approves or disapproves of the advertisement(s) that are to be delivered on its site. Typically, the site where the advertisement is to be presented is the secure web site where the financial institution's customer performs transactions over the network (e.g. the financial institution's secure web site). Nevertheless, the site where the advertisement is to be delivered can also include unsecure web sites (e.g. cnn.com, espn.com and the like). If the advertisement is not approved, then at 106 the marketer is informed of this decision and can also be given the reason for the disapproval of the advertisement. More description of the process involved in approval of the advertisement is described at FIG. 4.

If the advertisement is approved by at least some of the operators of web sites that are to display the advertisements, than at 108, the order data is processed to determine the customers who fall within the market segment. The advertisement delivery provider database 22 (FIG. 1) is queried by the software on the processor 26, which may include the database 22, to locate customers that fall within the market segment. In this database, each consumer, who is also a customer of one of the financial institutions that is a part of the system, is associated with a financial institution identification code (FIIDC), a unique customer identification code (UCIC) and an advertisement delivery identification code (ADIC). As stated above, each customer in the advertisement delivery provider database is associated with a customer identification that is not traceable back to the customer. Only the financial transaction history, which has been provided by the financial institutions, and other non-identifying information (e.g., zip code, sex, age) is stored in the advertisement delivery provider database and associated with the FIIDC, the UCIC and the ADIC for each individual customer. The UCIC is merely an anonymous profile that does not contain any means to identify the customer, i.e. name or social security number, other than the transactional financial history of the customer. Accordingly, the marketer is able to deliver an advertisement to a consumer who is ready, willing and able to purchase the good or service offered by the marketer; however, the identity of the consumer by the marketer and the advertisement delivery provider remains unknown.

The ADIC also designates the customer, however, this identification is assigned by the software of the system, which is operated by the advertisement deliver provider as opposed to by the financial institutions. The ADIC is most useful when the consumer logs onto a web site other than a secure web site operated by one of the financial institutions that is operating within the system. The ADIC provides an identification of the consumer that can be linked back to the UCIC and the financial information that is associated with the UCIC. When a consumer logs onto a secure financial institution's web site, which will be described in more detail below, the UCIC, which has been assigned by the financial institution, is already known because the financial institution knows the identity of its customer. However, the financial institution does not share the "true identity" (the "true identity" being an identifying characteristic that would allow the identity of the customer to be known to the advertisement deliver provider). Instead the financial institution only provides the UCIC to the advertisement delivery provider which as discussed above is not traceable back to the financial institution's customer's identity. Accordingly, the financial institution is providing a database of anonymous customers each having a different financial history. Thus only the financial transactions (and other non-identifying information) of the customer are known to the advertisement delivery provider.

At 108, the database is queried to determine which customers meet the criteria of the market segment to determine the expected success of the campaign. For the sports car example mentioned above, the database is queried to determine which consumers pay over $450 per month for a car. During processing, the expected campaign success and the time it will take the advertisement to meet a predetermined number of the consumers can also be reported to the marketer. For example, where the marketer defines the market segment very narrowly only a few consumers may meet the criteria and the likelihood for success of the advertising campaign is also low or will involve an unacceptable length of time before the number of targeted consumers will receive the advertisement. The number of consumers that meet the criteria of the segment can aid in determining how many consumers will receive the advertisement that is sent out. This will be described in more detail with reference to FIG. 6.

At 112 a report is generated that is sent to the marketer via the first portal 24 (FIG. 1). The report can include such information as the number of consumers in the market segment and the time it will take for a predetermined number of views of the advertisement. The time it will take to reach a predetermined amount of consumers can be determined by the amount of times on average consumers in that market segment log on to certain web sites that allow for the delivery of these targeted advertisements.

At 114, the marketer is asked whether it wishes to place an order for advertisements to be delivered.

Figure 3:
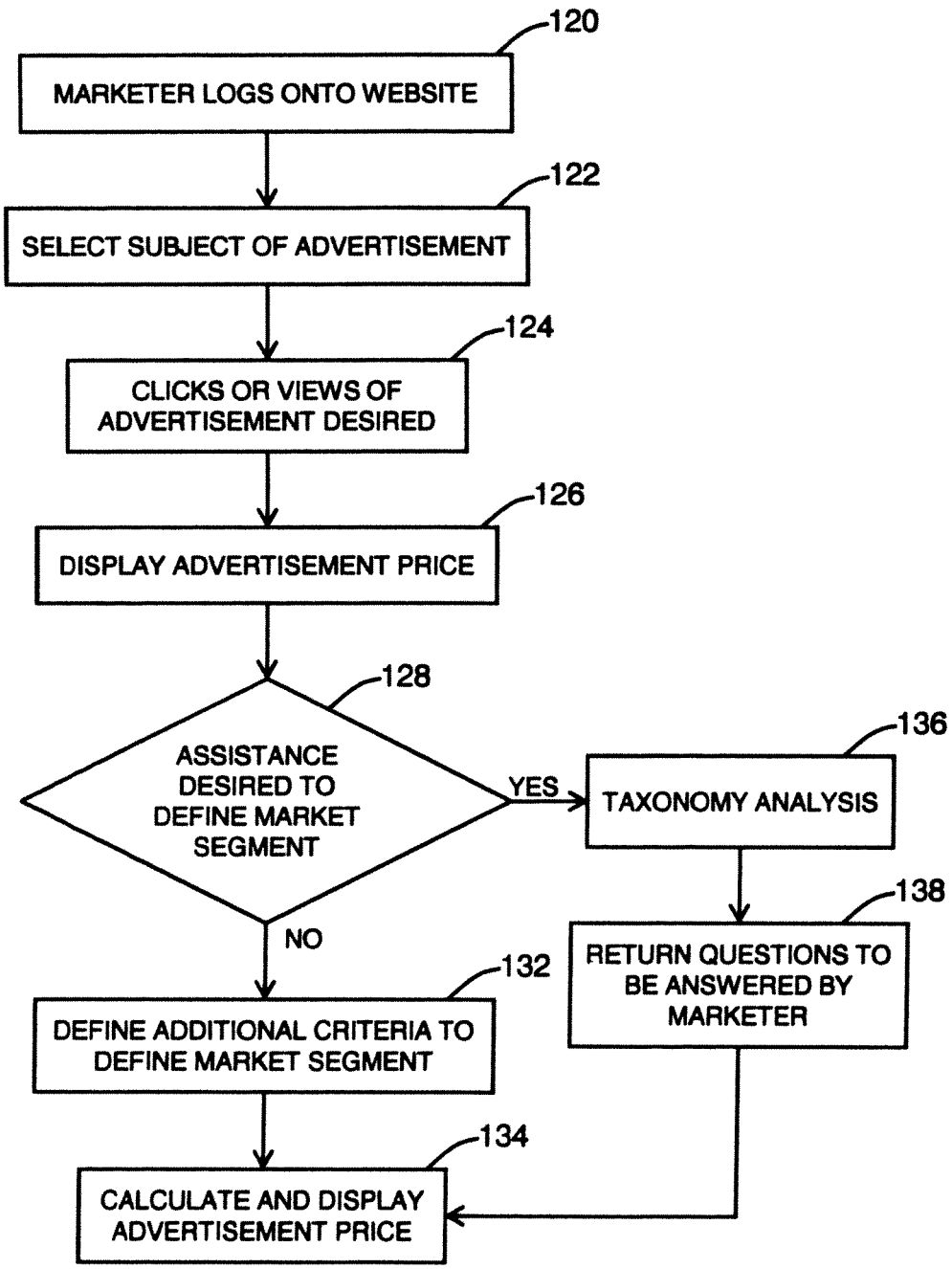
FIG. 3 is a flow diagram of a process for defining a market segment of consumers that is to receive an advertisement.

With reference back to how the market segment is defined (100 in FIG. 1), with reference to FIG. 3, at 120 the marketer logs onto a secure web site, which in the exemplary method is the non-consumer portal 24 in FIG. 1. The web site can be run by the advertisement delivery provider.

At 122 the marketer is presented with a screen that asks the marketer to select the item or service that is to be the subject of the advertisement that the marketer wishes to be delivered to consumers. In the example that is discussed above, the marketer may enter "cars" or "sports cars."

At 124, the marketer is then prompted to input the desired number of views or clicks of its advertisement that it wishes to obtain. A view is simply a posting of the advertisement on a web site that is viewed by the consumer. A click is when the consumer clicks on the advertisement and is taken to another web site, which is typically operated by the marketer, or an agent of the marketer, and further information can be provided about the service or product that is the subject of the advertisement.

At 126 the price that the marketer will pay for the advertisement to be displayed or clicked on the consumers portal 26 (FIG. 1) is displayed on the web page. The price of the advertisement can be a function of the product or service that is the subject of the advertisement. The price can also be a function of whether the advertisement is clicked or simply viewed. For example, products or services having a higher sales price will typically have a higher price per view or click and lower priced items or services will typically have a lower price per view or click.

At 128 the marketer will then be asked whether it wishes to be assisted in defining a market segment for its product or service or whether it wishes to define the market segment without assistance. If the marketer does not desire assistance in defining the market segment, for example the marketer is knowledgeable of the customers who desire its products, then at 132 the marketer is provided with additional criteria by which it can define the market segment. For example, at 132 the marketer can be presented with a grab bag of options to further define the market segment, examples of which include customers who have a current car payment that is within a certain monetary range, customers of a particular sex, customers of a particular age, customers who live in a particular zip code, etc. The grab bag of options may also include criteria that does not correlate exactly to the data stored in either the financial institution data base or the advertisement delivery provider database. For example, the grab bag could include such options: a range of money that the consumer allocates to entertainment, the amount of money spent on travel and other similar criteria. For these aforementioned criteria, the software operating on the system can be designed to calculate the entertainment budget of the customer by adding the monthly transactions of the customer such as movie tickets, concert tickets, sport events, dining, etc. Additionally, the software may factor that some of these purchases may also be in cash, which would not show up as a financial transaction in either database, and account for this by adding some percentage of the monthly total to the customer's budget. The budget can be averaged over a time period, e.g. year. At 134 the price of the advertisement is then recalculated with each additional criterion that is chosen by the marketer. The price is then displayed on the web site. The more criteria that is selected by the marketer to define the market segment, typically the higher the price of the advertisement.

If the marketer wishes to be assisted in defining a market segment for its product or service, then at 136 the product or service that is the subject of the advertisement is filtered by way of a taxonomy analysis. The taxonomy analysis classifies the good or service that is the subject of the advertisement. Based on the classification of the good or service that is the subject of the advertisement, questions are presented to the marketer to aid in defining the market segment at 138. For example, if the subject of the advertisement is a car, then the marketer can be prompted to decide whether it wishes to deliver advertisements to consumers who have paid 33 monthly installments on a car lease, which is an indication that the lease is about to expire. Another example would be if the subject of the advertisement is a home mortgage refinance product, the marketer can be prompted to decide whether it wishes to deliver advertisements to consumers who originated a mortgage in a certain year (for example, a year in which interest rates were known to be higher than they are at the time that the advertisement will be delivered). After the marketer has answered each question, which further defines the market segment, the price of the advertisement is displayed at 134 as a function of the criteria chosen by the market (by way of answering the questions).

Figure 4:
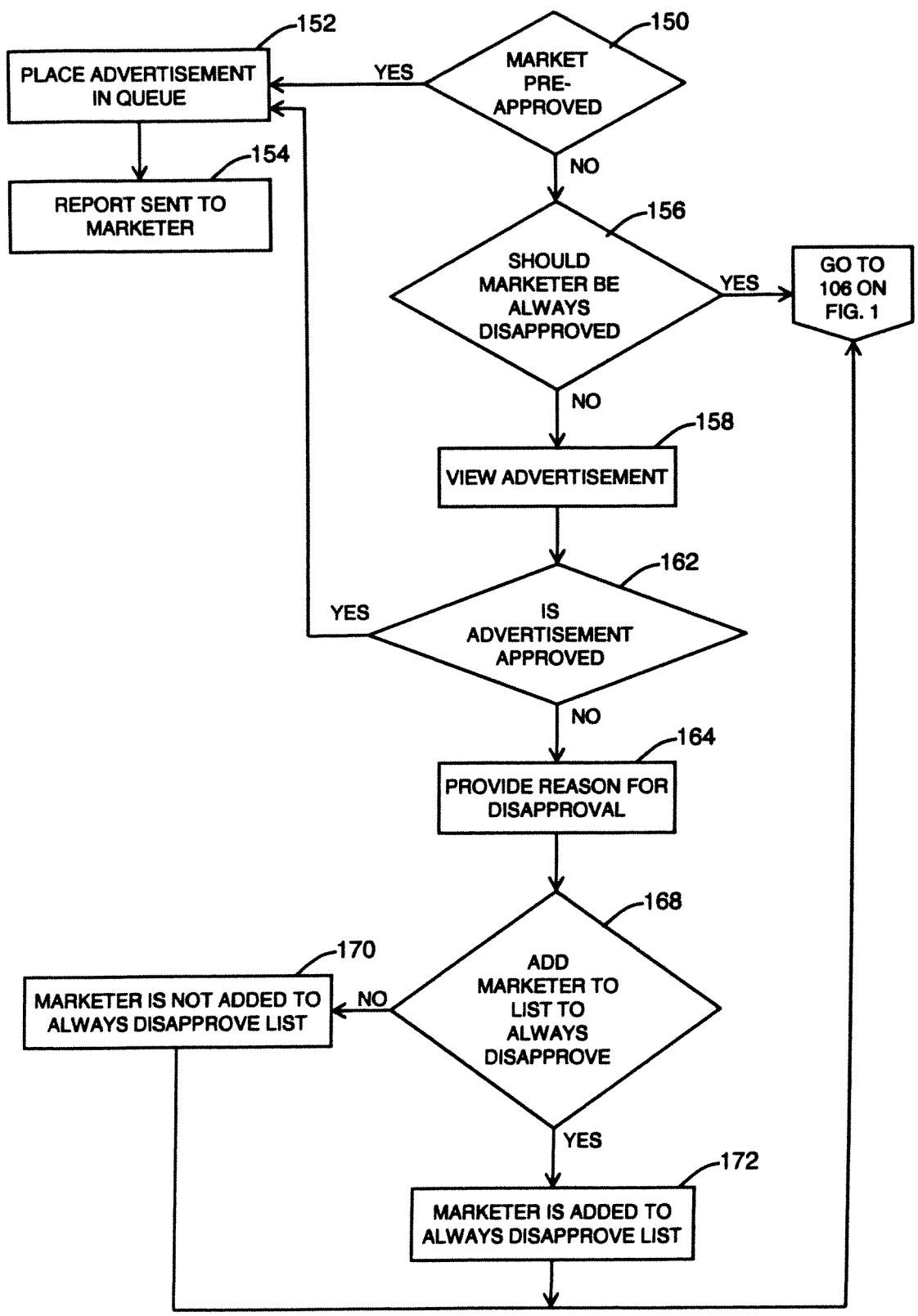
FIG. 4 is a flow diagram of a process for approving an advertisement to be displayed on a web site.

FIG. 4 more particularly describes how the site (or sites) that is/are to present the advertisement approve(s) or disapprove(s) of the advertisement(s) that are to be delivered on its site(s). At 150, the software that is operated by the advertisement delivery provider determines whether the marketer that wishes to have the advertisement displayed is a pre-approved marketer. Operators of web sites that will display advertisements can pre-approve certain marketers or classifications of marketers that are approved to display advertisements on their web sites. Whether the marketer is already a pre-approved marketer or is similar to a preapproved marketer and how many web site operators have pre-approved the marketer can have an effect on how quickly its advertisement will be viewed or clicked by the predetermined threshold of consumers that it desires to view or click its advertisement.

At 152, if the marketer has been preapproved by the web site operator that will display the advertisement, then the advertisement is automatically approved and placed in a queue of advertisements that are waiting to be viewed by customers who log onto the operator's web site and who are within the market segment that has been defined by the marketer. The queue of advertisements can be stored in the advertisement delivery provider database 22 (FIG. 1). At 154 a report can be generated and sent to the marketer informing the marketer of the web sites that have approved the marketer's advertisement.

If the marketer has not been preapproved by the web site operator, then at 156 the advertisement delivery provider determines whether the marker is a marketer or a classification of marketer that is always disapproved by the operator of the web site. If the marketer is a marketer or is in a classification that is always disapproved by the web site operator, then a report is generated, at 106 on FIG. 1, informing the marketer of the disapproval status.

If marketer is not always disapproved, then the advertisement is viewed by the web site operator at 158. The web site operator can be sent the advertisement via e-mail or the web site operator can log onto a web site, which can be the non-consumer portal 24 in FIG. 1, that is operated by the advertisement delivery provider to view the advertisement(s) awaiting approval. The web site operator then approves or disapproves the advertisement at 162. If the advertisement is approved, then the advertisement is placed in the queue at 152 and the report is generated at 154. If the advertisement is not approved, then at 164 the web site operator who was requested to display the advertisement is asked to answer why the advertisement has been disapproved. The web site operator, at 166, is also given the option to deny all advertisements from this particular marketer or classification of marketer. If the web site operator chooses to always disapprove the marketer, then at 172 the marketer is added to an always disapprove list and the marketer will always be disapproved by the web site operator. If the web site operator chooses to not always disapprove the marketer, then the marketer is not placed on the always disapprove list. The marketer is then notified that the advertisement has been disapproved by the web site operator.

Figure 5:
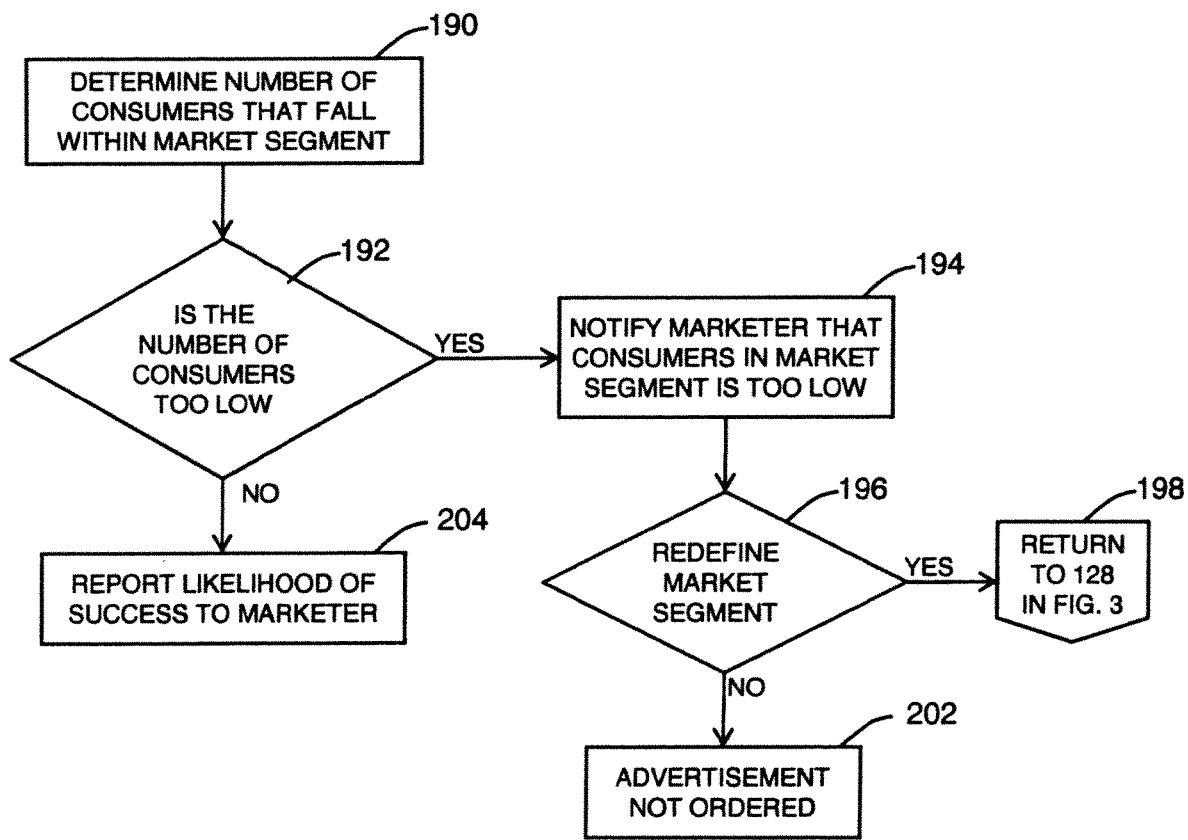
FIG. 5 is a flow diagram of a process for determining the success of an advertising campaign.

With reference back to FIG. 2, after the advertisement has been approved by the web site that is to display the advertisement—the advertisement may be displayed on a number of different web sites, each requiring some sort of approval—the projected success of the advertisement reaching the predetermined threshold of consumers is determined at 108. FIG. 5 provides a more detailed description of how the projected success is determined.

With reference to FIG. 5, at 190 the number of consumers in the advertisement delivery provider database that fall within the market segment is determined. This is accomplished by querying the advertisement delivery provider database to locate the consumers that match the market segment that has been defined by the marketer. At 192, the software running on the system determines if the number of consumers in the market segment is too low. If the number of consumers that match the market segment is too low, then, at 194, the marketer is notified that there is a small likelihood that the advertisement will be viewed by the number of consumers that the marketer would like to view the advertisement. An example of the consumers in the market segment being too low is where the marketer wishes to display their advertisement 100,000 times but the advertisement delivery provider database only returns 100 eligible consumers in the market segment, then the advertisement will most likely take too long to display 100,000 times. At 196, the marketer will be given the option to redefine the market segment to reach a greater number of consumers. If the marketer chooses to redefine the market segment, then, at 198, the marketer is returned to 128 in FIG. 3 to see if the marketer desires assistance in defining the market segment. In addition to, or in lieu of returning to fully redefining the market segment, at 198 the marketer can also be presented with recommendations for increasing the number of consumers within the market segment. The software of the system can break out the criteria used to define the market segment and suggest that if certain criteria for the market segment were to be removed then the number of consumers that could view the advertisement could be increased. For example, the marketer could be presented with the option to define the market as including both males and females, where the original market segment criteria was limited only to females. If the marketer chooses not to redefine the market segment, then, at 202, the advertisement is not ordered by the marketer.

If the number of consumers is not too low, for example if the marketer desires 100,000 views of the advertisement and 75,000 consumers qualify for the market segment, then, at 204, the software of the system returns a report to the marketer that the advertising campaign should be successful. The report can include an estimate of the time it will take the advertisement to display the desired number of views of the advertisement. This information can be based on the number of consumers who have qualified for the market segment and the web surfing habits of the consumers in the market segment.

Moving to the consumer side of the advertisement delivery process, at 220 the consumer 14 (FIG. 1), who is also a customer of the financial institution 12 (FIG. 1), logs onto the financial institution's web site. The consumer logs onto a protected portion of the financial institution's web site where the consumer must identify himself appropriately so that, for example, the financial institution allows the user to perform banking transactions over the Internet.

After the consumer logs onto the financial institution's web site software that is running on the financial institution's web site, which is also part of the system 8 (FIG. 1), checks for the presence of a cookie, or similar file, stored on the consumer's computer at 222. The cookie included is a text file that is stored on the consumer's computer that includes the ADIC. If the cookie is not present, then at 224 the software that is running on the financial institution's web site assigns an ADIC for the customer that corresponds with the UCIC for that consumer. The UCIC is known since the consumer has logged into the financial institution's secure web site, thus verifying the identity of the consumer. This ADIC is then stored as a cookie on the consumer's computer for later reference.

If the cookie is present or after the cookie has been stored on the consumer's computer, then at 226 the software queries the advertisement delivery provider database for defined market segments for advertising campaigns for which the customer qualifies. At 228, the software determines whether the customer qualifies for any market segments for advertising campaigns that are warehoused in the advertisement delivery provider database. If the customer does not belong to a defined market segment, then at 232 a non-targeted advertisement is displayed on the web site. If the customer belongs to a defined market segment, then at 234 a targeted advertisement can be displayed on the web site.

If the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed.

The consumer can also indicate to the institution that he/she is not interested in receiving any such advertisement and so the institution, or the delivery provider, will block the delivery of any advertisements to that consumer.

Figure 6:
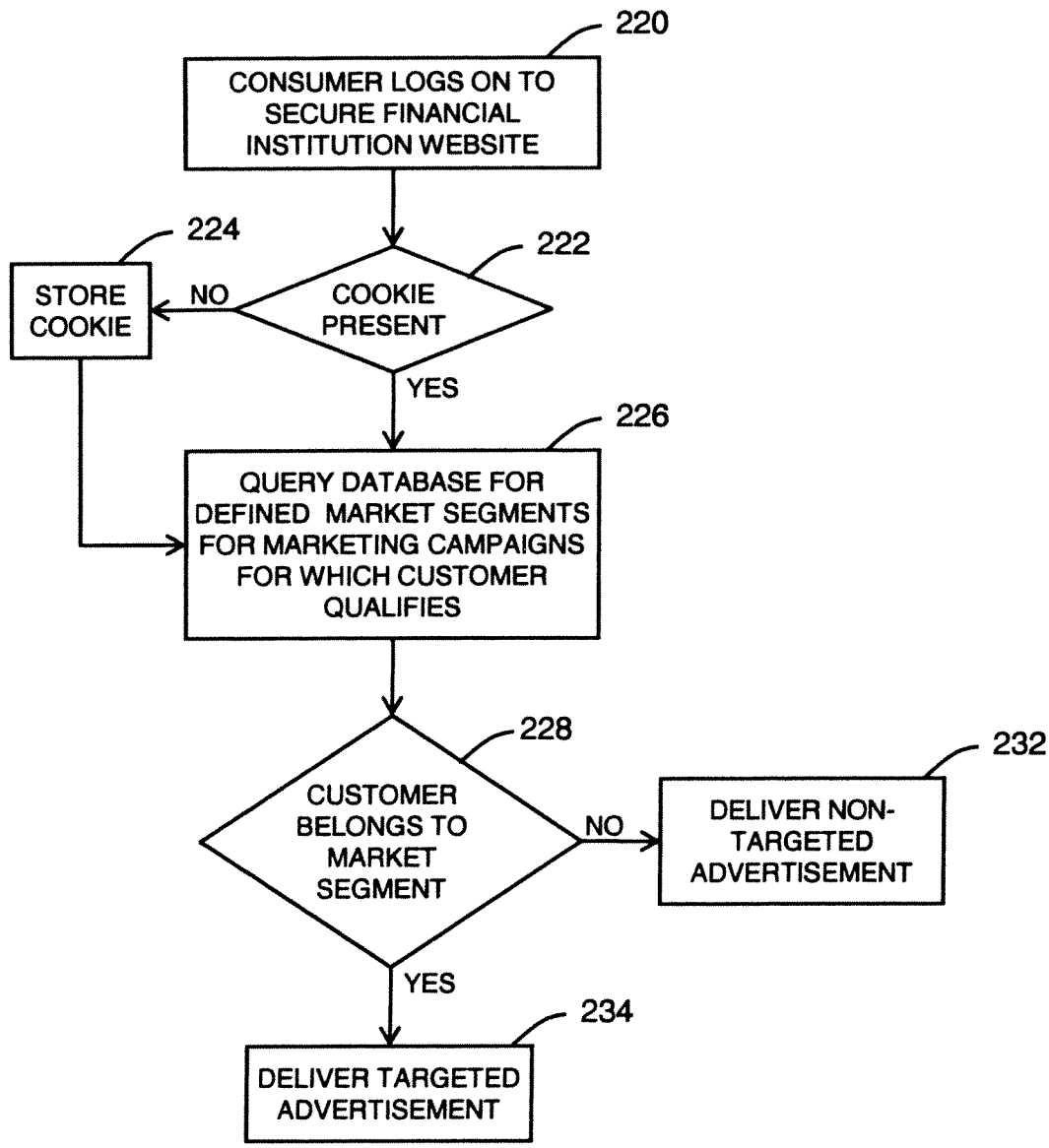
FIG. 6 is a flow diagram depicting a process for delivering an advertisement to a consumer.
Figure 7:
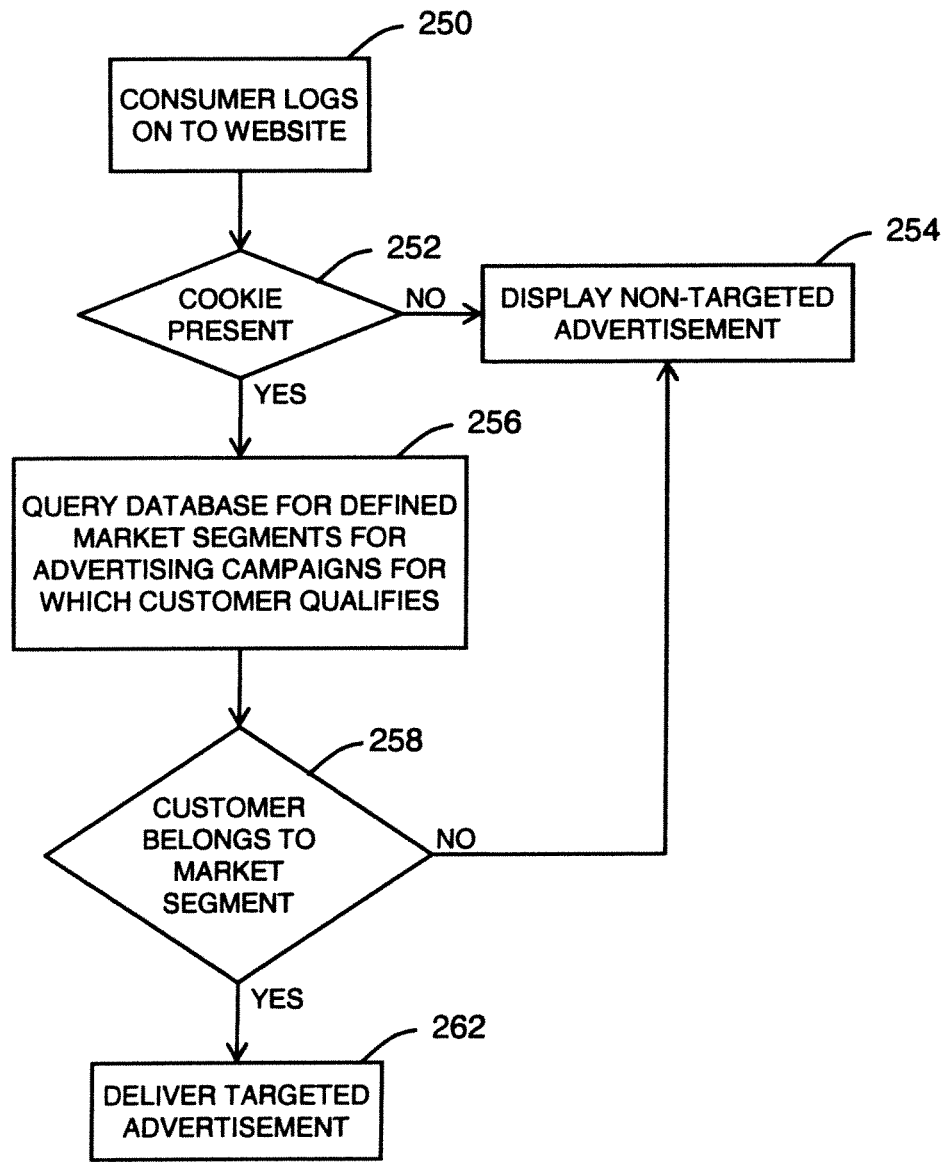
FIG. 7 is a flow diagram of another process for delivering an advertisement to a consumer.

With reference to FIG. 7, where a consumer logs onto a web site that is operated by a third party advertisement presenter, i.e. a web site that is not a secure web site of a financial institution (e.g. cnn.com, espn.com) the process for delivering an advertisement is slightly altered as compared to the process depicted in FIG. 6. At 250 the consumer logs onto a third party advertisement presenter's web site. At 252, the software running on the third party presenter's web site checks for a cookie containing the ADIC. If the cookie is not present, at 254, a non-targeted advertisement is delivered to the web site for the consumer to view. If the cookie is present, then at 256 the software queries the advertisement delivery provider database for defined market segments for advertising campaigns for which the customer qualifies. At 258, the software determines whether the customer qualifies for any market segments for advertising campaigns that are warehoused in the advertisement delivery provider database. If the customer does not belong to a defined market segment, then at 254 a non-targeted advertisement is displayed on the web site. If the customer belongs to a defined market segment, then at 262 a targeted advertisement can be displayed on the web site.

Similar to the process defined with regard to FIG. 6, if the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed. In other words, an advertisement that costs $10 per display will have a greater likelihood of being delivered to a web site than an advertisement that costs $5.

Figure 8:
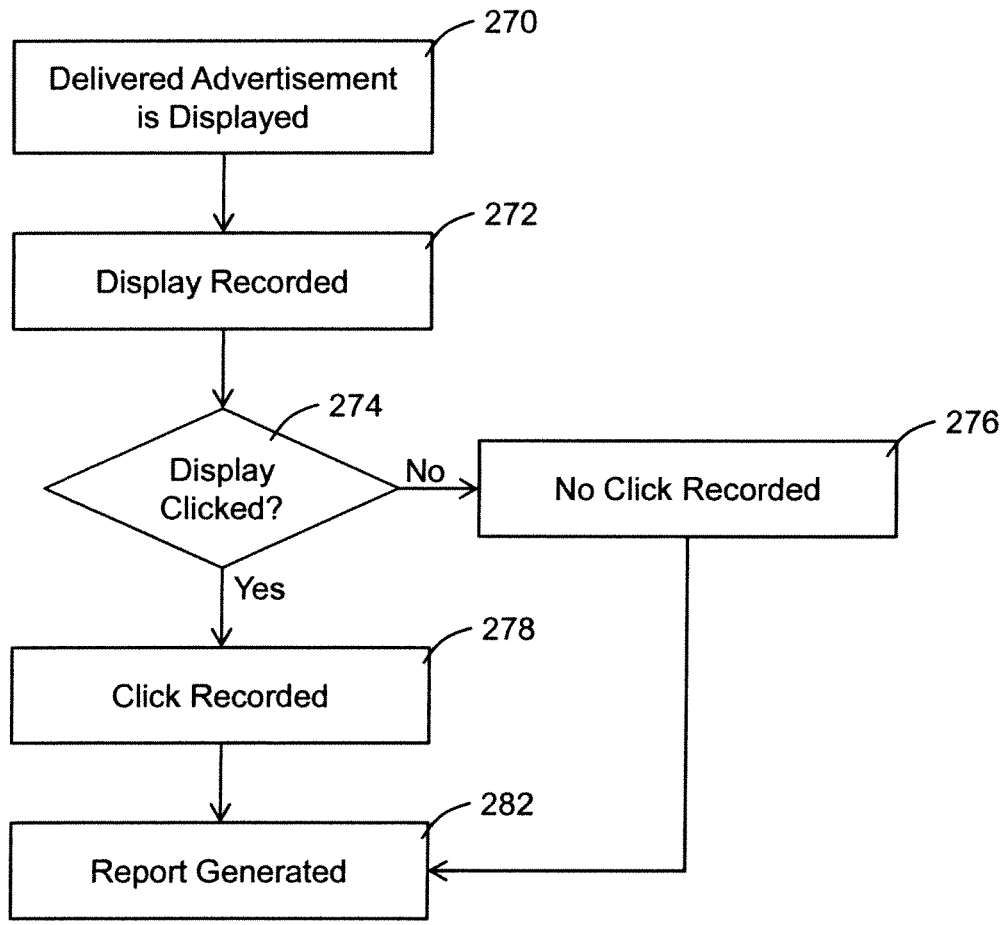
FIG. 8 is a flow diagram for a method for recording the display and the click of a targeted advertisement.

With reference to FIG. 8, the results of the advertisement display are reported to the marketer. At 270 the delivered targeted advertisement is displayed on the web site that the consumer is viewing (whether the web site is the secure web site of a financial institution or a third party advertisement presenter's web site). At 272 the software of the system records that the advertisement has been displayed. At 274 the software determines whether the advertisement has been clicked. If the consumer does not click on the advertisement, then this action is recorded at 276. If the consumer does click on the advertisement, then the consumer is directed to another web site, typically operated by the marketer, and this action is recorded at 278. At 282 a report is generated that is sent to the marketer that provides the results of the advertising campaign. Since the marketer can pay for an advertisement on a "view or display" basis and on a "click" basis, the report can provide a basis for billing the marketer for the advertising campaign. Moreover, the report can provide the marketer information such as the percentage or viewed advertisements that were clicked, which will be helpful in defining future market segments for similar products.

Figure 9:
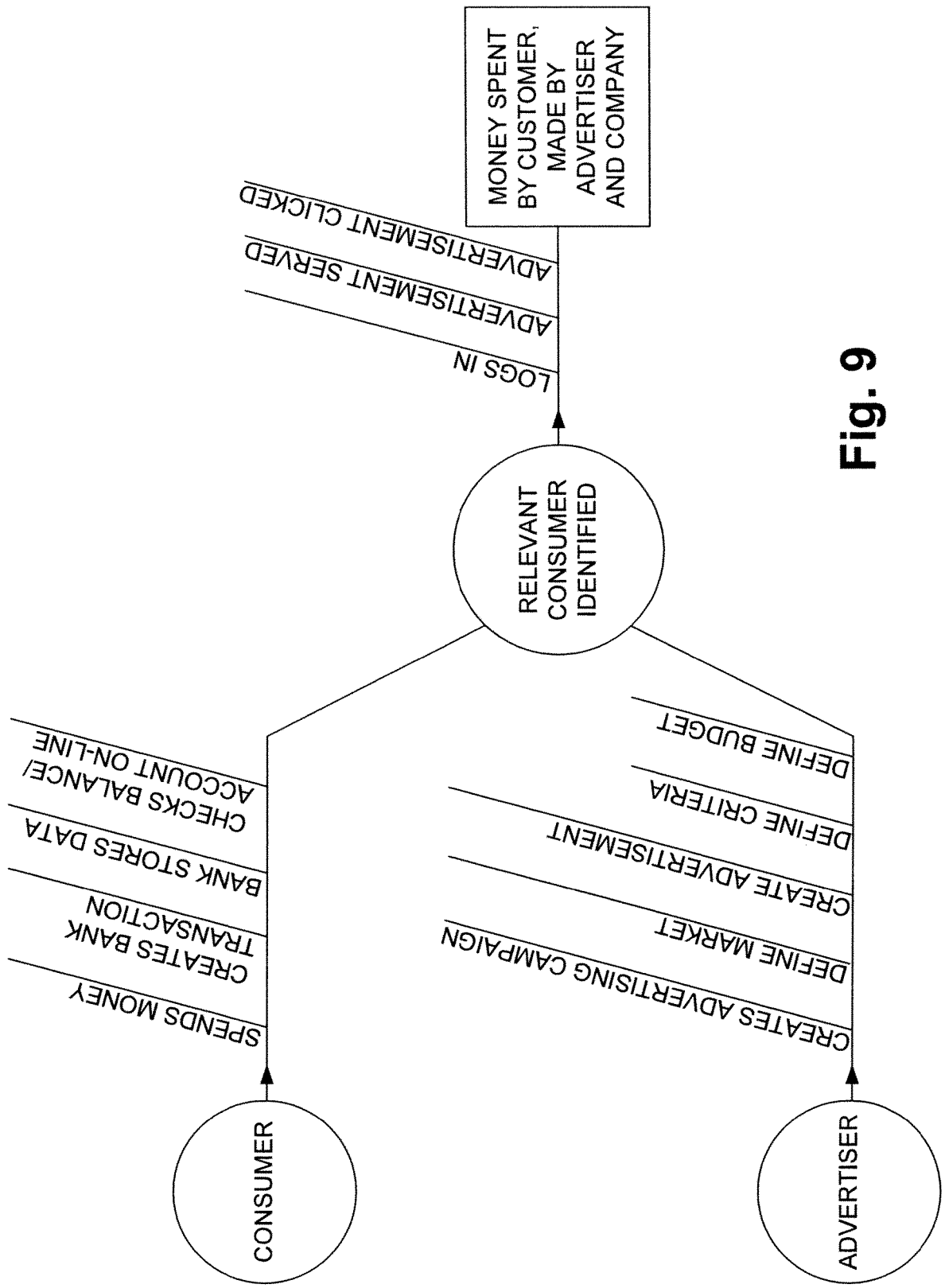
FIG. 9 is a schematic diagram illustrating the pertinent activities of the consumer and advertiser in the context of the present embodiment.

FIG. 9 is a schematic diagram illustrating the pertinent activities of the consumer and advertiser in the context of the present embodiment.

Figure 10:
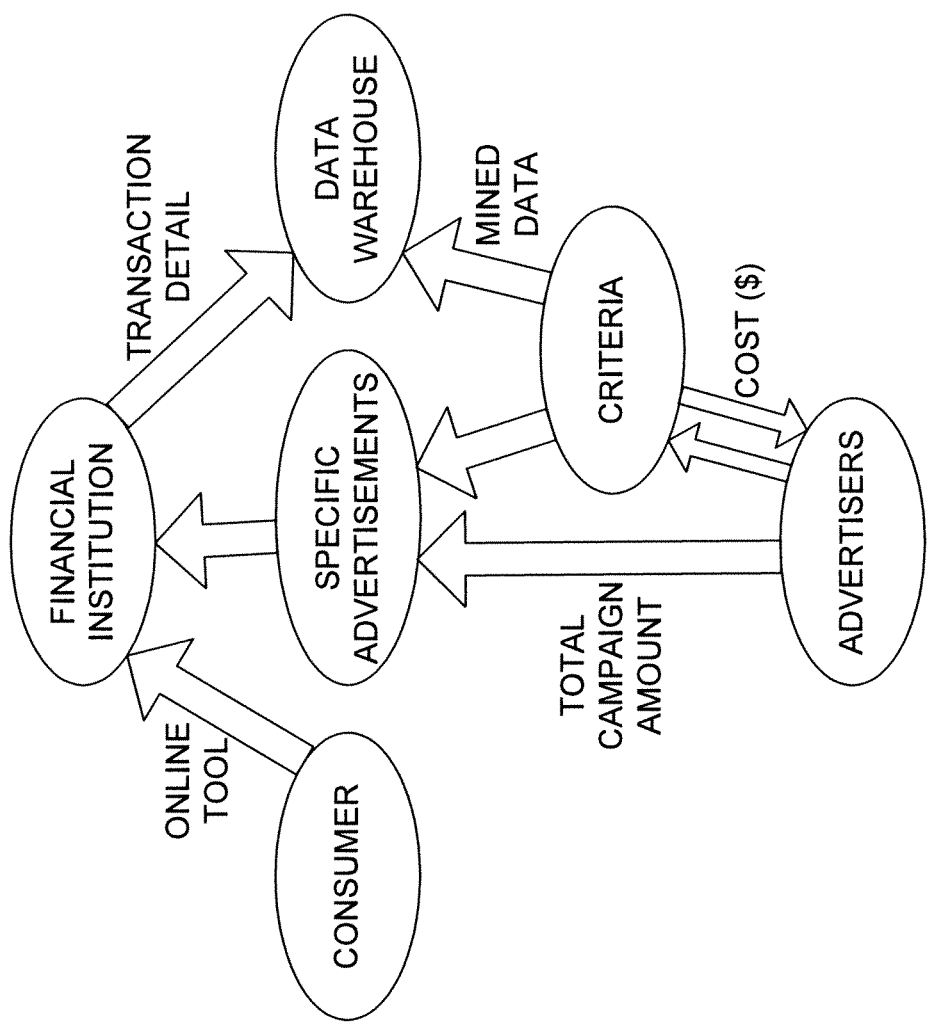
FIG. 10 is a diagram showing communication paths between consumers, advertiser, the bank and the advertisement delivery provider.

FIG. 10 is a diagram showing communication paths between consumers, advertiser, the bank and the advertisement delivery provider.

In accordance with various other features described herein, systems and methods are described that overcome the above-described problems by incentivizing vendors to provide larger discounts when offering an item or service in an advertisement placed on a third party website, in return for reduced cost associated with advertisement placement on the website. Similarly, the described systems and methods encourage an owner or host of the website to accept a smaller payment for advertisement placement on the website in return for larger discounts for customers visiting the website.

It will be appreciated that although the "events" that are tracked are described herein as being associated with a website (e.g., user clicks on a web page, user completion of a survey on a website, presentation of an ad on a website, etc.), such events are not limited to being associate with a website. For example, an event can include user activation of an application (an "app"), on a computer or a mobile device. In another example, the event includes a user action (e.g., executing, interacting with, etc.) with the app. For instance, the event can comprise a user downloading and/or installing an app on a mobile device such as a smartphone. Moreover, the advertisements described herein are not limited to being displayed on a website, but rather can also be presented to the user within an application, during application download or installation, or the like. Events that occur via interaction with the application, such as user clicks on the advertisement, purchases of the item or service offered in the advertisement, etc., can then be tracked and a CPE determined therefor.

Figure 11:
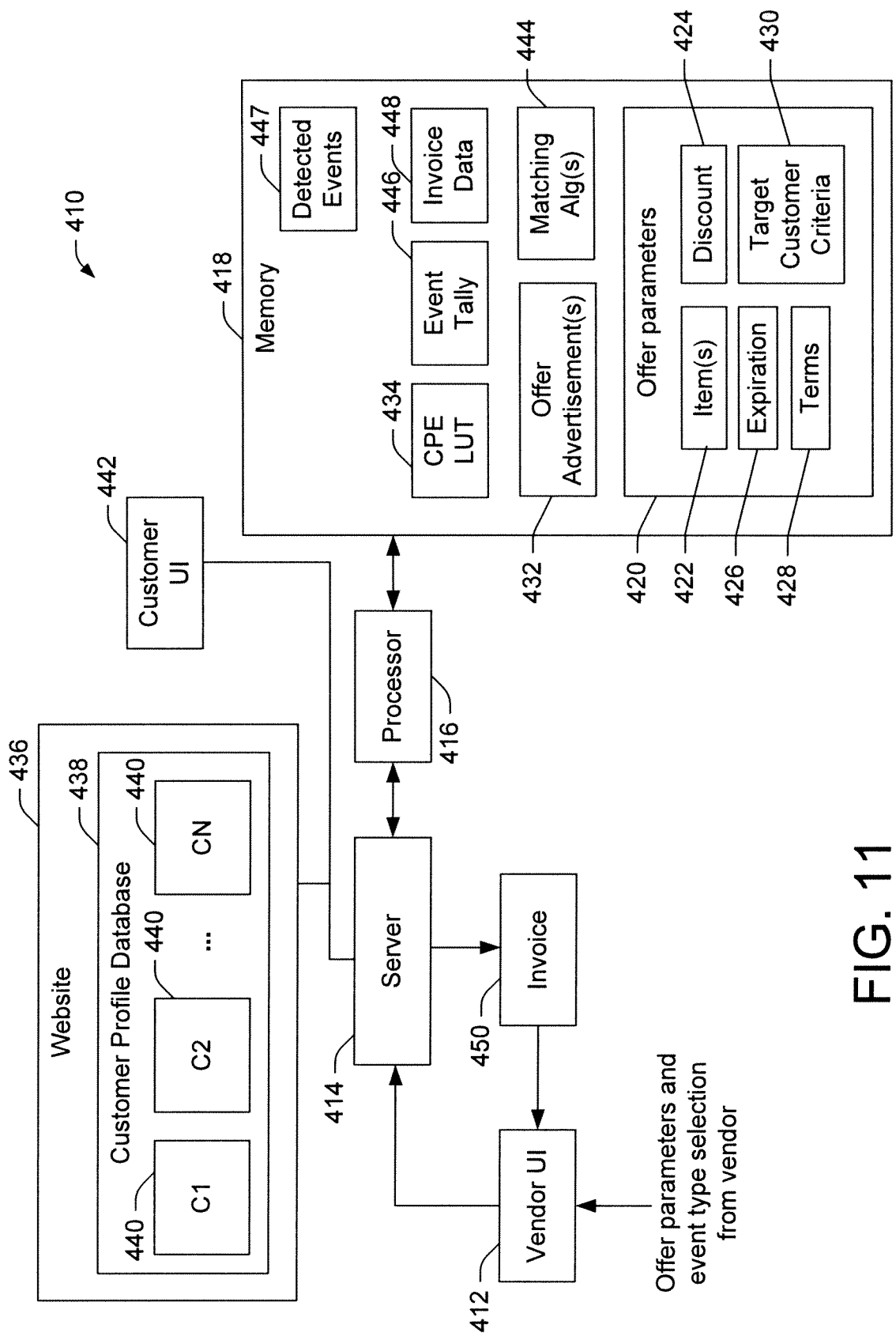
FIG. 11 illustrates a system that facilitates providing targeted, vendor-generated advertisements via a retail merchant's website to a qualified customer, and sending an invoice to a vendor generating the advertisements wherein the vendor is given a scalable discount per event associated with targeted advertisements placed based on the size of a discount offered by the vendor in the advertisement.

With reference to FIG. 11, a system 410 is illustrated that facilitates providing targeted, vendor-generated advertisements via a retail merchant's website to a qualified customer, and sending an invoice to a vendor generating the advertisements wherein the vendor is given a scalable discount per event associated with one or more targeted advertisements placed based on the size of a discount offered by the vendor in the advertisement. In accordance with the various systems and methods described herein, the event may be, for example, the occurrence of a predefined number of presentations or impressions of the advertisement to qualified customers. For instance, the event may be 1000 presentations of the advertisement, and the cost per thousand (e.g., cost-per-mil) presentations is a function of the size of the discount offered in the advertisement. Other examples of events may include without limitation: a predefined number (e.g., 1, 5, 10, 100, 500, 1000, etc.) of times the advertisement is clicked on by qualified users to whom the advertisement is presented (e.g., a cost-per-click or per predefined number of clicks); an action or predefined number of actions, such as the customer completing a form or survey, buying an item, etc. (e.g., a cost-per-action); a predefined amount of revenue generated from the targeted advertisement presentations (e.g., a cost-per-revenue); a transaction or predefined number of transactions such as a purchase or the like (e.g., a cost-per-transaction); or any other suitable metric by which the effectiveness of the targeted advertisement can be measured in order to charge the vendor for placing the targeted advertisement. In any case, the greater the discount offered by the vendor, or the greater the size of the offer in the advertisement, the lower the CPE for placing the targeted advertisement. In one example, the bank may select a CPE amount as a function of what they want to be paid, and the offers are correlated to make up that total. For instance, if a bank desires a $7 CPE and the offers are a mix of $5 and $8 CPEs, the system can mix the offers to achieve the desired CPE of $7 (e.g., two-thirds of the events are associated with $8 CPE offers, and one third with $5 CPE offers.

The diagram of the system is provided for the purpose of explaining interrelationships between various data in the system, and the embodiments of the present application are not limited to the arrangement shown. Although each of the blocks in the diagram is described sequentially in a logical order, it is not to be assumed that the system processes the described information in any particular order or arrangement.

The system 410 includes a vendor user interface (UI) 412 (e.g., a computing device such as a personal computer, laptop, PDA, Smartphone, etc.), via which the vendor (or manufacturer) enters parameter information related to a desired advertisement or offer that the vendor wishes to present to qualified customers on a retail merchant's web-site. Additionally, the vendor identifies or enters an event type (e.g., a user-click, purchase, completed form, or the like) that the vender wishes to be detected to calculate the CPE. The vendor UI 412 accesses a system server 414 (e.g., an advertisement server run by an advertisement generating company or entity and which generates advertisements for placement on one or more websites) that is coupled to one or more processors 416, which in turn is coupled to a memory 418 (e.g., a computer-readable medium or database, etc.). The processor 416 and memory 18 may be integral to the server or remote thereto.

The processor 416 executes, and the memory 418 stores, computer executable instructions for carrying out any and all functions, methods, techniques, etc., described herein. The memory 418 may be a computer-readable medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor 416 can read and execute. In this context, the system 410 may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The vendor enters advertisement or offer parameter information 420 in the vendor UI 412, which is received at the server 14 (e.g., over an Internet connection, a cellular connection, etc.), processed by the processor 416, and stored in the memory 418. The offer parameters 420 may include, without being limited to, information describing items 422 to be offered for sale to the customer, discount information 424 (e.g., a discount percent, a fixed amount off, etc.), expiration information 426, other terms 428 of the offer (e.g., 10% off for a purchase over $50.00), a number of permitted acceptances of the offer (e.g., offer valid to the first 1000 customers who accept the offer on a first-come first-served basis), etc. The offer parameter information 420 additionally includes target customer criteria 430 (i.e. vendor-specified KLIs) that describe what the vendor considers to be an ideal customer to whom the offer should be presented. The vendor may provide or generate artwork or graphics that are employed or presented in the advertisement. The processor 416 executes instructions to generate one or more offer advertisements 432 based on the vendor-entered offer parameter information and the graphics or artwork provided by the vendor.

Additionally, the processor 416 access a cost-per-event (CPE) lookup table (LUT) 434 to retrieve pricing information for the advertisement(s) 432. Pricing may be a function of any suitable variables including but not limited to advertisement size, prominence of the advertisement on a webpage, etc. Additionally, the price information CPE LUT 434 is a function of the size of the discount offered by the vendor. For instance, given a set of offer parameters, an advertisement may have a CPE of $15 for placing 1000 targeted advertisements. If the vendor offers a 10% discount in the advertisement, the CPE may be $13. A discount of 20% may result in a CPE of $10.50, and so on. In another example, the discount may be a flat-rate discount (e.g., $10, $20, etc., where greater discounts are rewarded with lower CPEs). It will be appreciated that the reduced CPE scale for larger discounts may be linear or non-linear, as a matter of design choice.

Optionally, the target customer criteria 430 include tolerance or threshold information (not shown), whereby the vendor can specify a tolerance for the target customer criteria being met. For instance, the vendor can specify that if a predefined percentage of the criteria (e.g., 80%, 90%, 95%, etc.) of the criteria are met by a customer, then the offer may be presented to the customer, to increase a number of customers reached by a given advertisement while ensuring that the customer is still a desirable target for the advertisement. According to an example, a vendor may specify three KLIs that the vendor desires to be associated with a customer in order to present the targeted advertisement to the customer. The vendor may assign priority levels or weights to each of the KLIs. If fewer than a desired number of customers match all three criteria, then the third-priority KLI may be dropped and customers matching the two more heavily weighted KLIs may be targeted for presentation of the advertisement in order to achieve a desired number of advertisement presentations to the desired number of qualified customers.

The server 414 (and/or processor 416) accesses a website 436, which may be the vendors' own website, or any other website that permits advertisements to be placed thereon. The website 436 has associated therewith a customer profile database 438 that includes customer profiles 440 for any number of customers (labeled as C1, C2, CN, where N is an integer). The customer profiles 440 include information about the customers that is entered directly by the customer (e.g., age, zip code, personal interests or hobbies, occupation, marital status, etc.) or that is inferred by customer actions (e.g., purchases, webpage history, etc.). When a customer logs on to the website 436 via a customer UI 442, the processor executes a matching algorithm 444 (e.g., a set of computer-executable instructions) that compares the customer's profile 440 to the target customer criteria 430 to determine whether the customer satisfies the target customer criteria 430. If a match is identified, then the offer advertisement 432 is presented to the customer on the website 436.

Events 447 are trackable inputs (ad presentations, clicks, transactions, actions, revenue generated, etc.) associated with the advertisement and are stored to the memory 418. As events occur, an event tally component or algorithm 446 is run by the processor 416 to keep track of the number of events 447. Periodically (e.g., monthly, quarterly, etc.), invoice data 448 is generated comprising the number of events associated with the advertisement, the CPE for the advertisement, and the total cost of the advertisements for the period. An invoice 450 is generated by the processor 416 from the invoice data 448 and transmitted to the vendor. When the vendor pays the amount due on the invoice, a portion of the payment is provided to the owner of the website 446, and the remainder is retained by the provider of the advertisement placement service (e.g., the server owner).

The server 414 is operated by an advertisement company or the like, which generates advertisements and targets specific customers for the vendor. According to another aspect, the advertisements can be pre-generated by the vendor and provided to the advertisement server for presentation to qualified customers. Because the matching algorithm 444 identifies customers by their customer profiles, which may be closely held by the company owning the website, anonymity is maintained with regard to the vendor. That is, potentially private customer profile information is not provided to the vendor, but rather only access for comparison to the target customer criteria specified by the vendor. Indeed, the vendor need not be informed of the identity of the customers to whom its offers are advertised.

Figure 12:
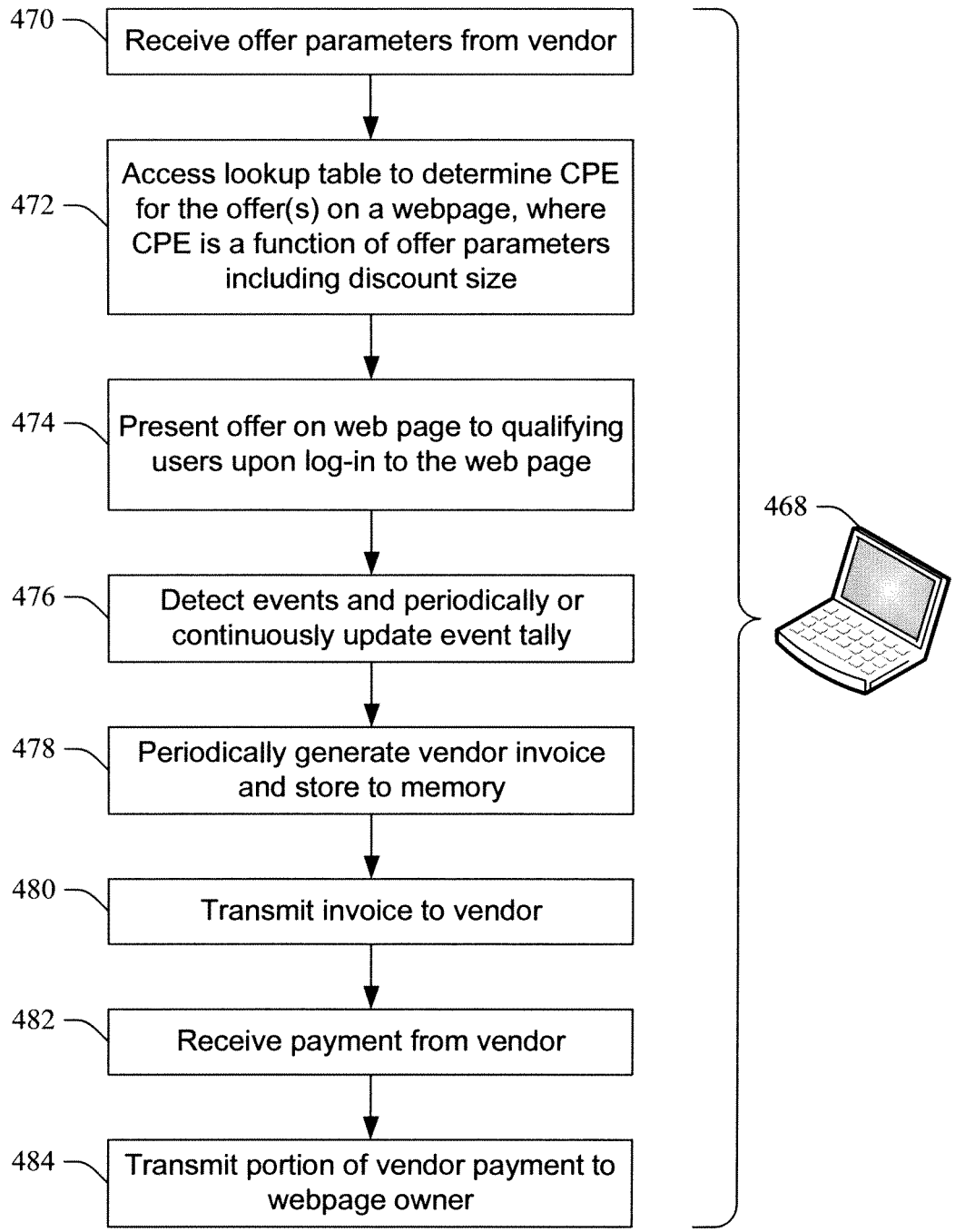
FIG. 12 illustrates a method of providing the service described with regard to FIG. 11, in accordance with various aspects described herein.

FIG. 12 illustrates a method of providing the service described with regard to FIG. 11, in accordance with various aspects described herein. One or more of the steps described with regard to the method of FIG. 12 may be performed on a computer 468. At 470, offer parameter information is received from a vendor. At 472, a CPE lookup table is accessed to identify a CPE for the offers, which are presented on a particular website. The CPE is a function of the offer parameters, including the size of the discount offered, as well as the event type (presentation, click, purchase, survey completion, etc.) specified by the vendor. At 474, the offer is presented to qualifying customers when they log on to the website. Customer qualification is determined by comparing vendor-specified target customer criteria to a customer profile for the customer. At 476, the vendor-specified event is detected a tally of the number of times the specified event has occurred is updated (e.g., periodically or continuously). Periodically, a vendor invoice is generated, at 478. The invoice is transmitted to the vendor at 480. Payment is received from the vendor at 482.

A predetermined portion of the vendor's payment is then provided to the website owner or host, at 484. In this manner, the website host receives payment for permitting the advertisement to be displayed on its website, and accepts a smaller payment per event for advertisements displayed for larger discounts for its visitors. In another example, the website owner receives a prescribed fee per event (e.g., per a predefined number of advertisement presentations, per a predefined number of clicks on the advertisement by targeted customers, etc.), and the advertisement provider accepts a smaller payment for larger discounts. In yet another example, the website owner and the advertisement provider both accept a reduced payment when the vendor offers larger discounts. The vendor is incentivized to provide larger discounts to entice customers to click on the advertisement, and the website host is incentivized to charge less per advertisement display in order to provide larger discounts to its visitors or customers, which in turn increases the likelihood of future visits to the website by customers.

Figure 13:
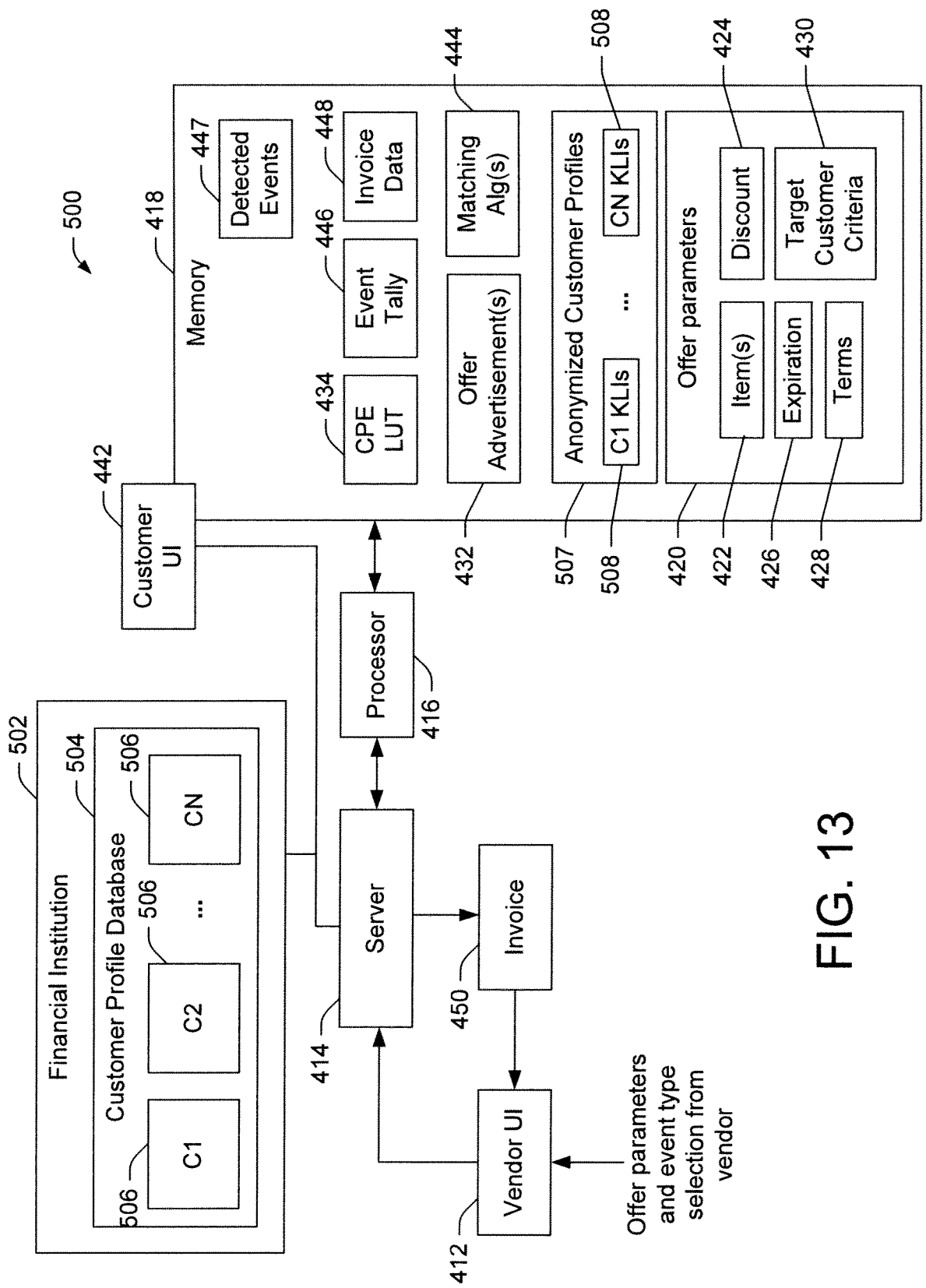
FIG. 13 illustrates a system that facilitates providing targeted, vendor-generated advertisements via a financial institution's website to a qualified customer, and sending an invoice to a vendor generating the advertisements wherein the vendor is given a scalable discount per event associated with targeted advertisements placed based on the size of a discount offered by the vendor in the advertisement.

FIG. 13 illustrates a system 500 that facilitates providing targeted, vendor-generated advertisements via a financial institution's website to a qualified customer, and sending an invoice to a vendor generating the advertisements wherein the vendor is given a scalable discount per event associated with targeted advertisements placed based on the size of a discount offered by the vendor in the advertisement. An "event" may be a predefined number of advertisement presentations to qualified customers, one or more transactions, one or more clicks on the advertisement, or any other suitable metric as described above with regard the preceding figures. The system 500 includes the vendor UI 412, via which the vendor enters parameter information related to a desired advertisement or offer that the vendor wishes to present to qualified customers on a retail merchant's website. Additionally, the vendor identifies or enters an event type (e.g., a user click, purchase, form or survey completion, etc.) that the vendor wishes to be tracked in order to calculate the CPE. The vendor UI 412 accesses the system server 414, which is coupled to one or more processors 416, which in turn is coupled to the memory 418 (e.g., a computer-readable medium or database, etc.). The processor 416 and memory 418 may be integral to the server or remote thereto.

The vendor enters advertisement or offer parameter information 420 into the vendor UI 412, which is received at the server 414 (e.g., over an Internet connection, a cellular connection, etc.), processed by the processor 416, and stored in the memory 418. The offer parameters 420 may include, without being limited to, information describing items 422 to be offered for sale to the customer, discount information 424 (e.g., a discount percent, a fixed amount off, etc.), expiration information 426, other terms 428 of the offer (e.g., 10% off for a purchase over $50.00), etc. The offer parameter information 420 additionally includes target customer criteria 430 that describe what the vendor considers to be an ideal customer to whom the offer should be presented. The vendor enters the offer information by selecting offer parameters from one or more dropdown menus, entering information into a text box or field, or the like. The vendor may provide or generate artwork or graphics that are employed or presented in the advertisement. The processor 416 executes instructions to generate one or more graphical offer advertisements 432 based on the vendor-entered offer parameter information and the optional graphics or artwork provided by the vendor.

Additionally, the processor 416 accesses the CPE LUT 434 to retrieve pricing information for the advertisement(s) 432. Pricing may be a function of any suitable variables including but not limited to advertisement size, prominence of the advertisement on a webpage, etc. Additionally, the price information in the CPE LUT 34 is a function of the size of the discount offered by the vendor. For instance, given a set of offer parameters, an advertisement may have a CPE of $20 for placing 1000 targeted advertisements. If the vendor offers a 10% discount in the advertisement, the CPE may be $18. A discount of 20% may result in a CPE of $16 and so on. It will be appreciated that the reduced CPE scale for larger discounts may be linear or non-linear, as a matter of design choice.

Optionally, the target customer criteria 430 include tolerance information, whereby the vendor can specify a tolerance for the target customer criteria being met. For instance, the vendor can specify that if a predefined percentage of the criteria (e.g., 80%, 90%, 95%, etc) of the criteria are met by a customer, then the offer may be presented to the customer, increase a number of customers reached by a given advertisement while ensuring that the customer is still a desirable target for the advertisement. According to an example, a vendor may specify five criteria or KLIs that the vendor desires to be associated with a customer in order to present the targeted advertisement to the customer, and the vendor may assign priority levels or weights to each of the KLIs. If fewer than a desired number of customers match all five KLIs, then the lowest-priority KLI may be dropped and customers matching the four more heavily weighted KLIs may be targeted for presentation for the advertisement in order to achieve a desired number of advertisement presentations to the desired number of qualified customers.

The server 414 (and/or processor 416) accesses a financial institution's website 502, which permits advertisements to be placed thereon. The website 502 has associated therewith a customer profile database 504 that includes customer profiles 506 for any number of customers (labeled as C1, C2, CN, where N is an integer) of the financial institution. The memory 418 stores anonymized customer profiles 507 that include key lifestyle information or indicators (KLIs) 508, which may include information about the customers C1 through CN that is entered directly by the customer (e.g., age, zip code, personal interests or hobbies, occupation, marital status, etc.) or that is inferred by customer actions (e.g., purchases, webpage history, anonymized bank account and/or transaction information, etc.). Such information and the user thereof to identify target customers is described in co-pending U.S. patent application Ser. No. 12/266,199, and co-pending U.S. patent application Ser. No. 12/403,656, both of which are incorporated by reference herein in their entireties. Anonymization of the customer profile information is described herein with regard to FIGS. 1-10.

When a customer logs on to the website 502 via the customer UI 442, the processor executes the matching algorithm 444 (e.g., a set of computer-executable instructions) that compares the KLIs 508 in the customer's profile 506 to the target customer criteria 430 to determine whether the customer satisfies the target customer criteria 430. If a match is identified, then the offer advertisement 432 is presented to the customer on the website 502.

Events 447 are trackable inputs (e.g., user clicks, purchases, forms filled out by the user, other user actions, etc.) and are stored to the memory. As the trackable events occur, the event tally component or algorithm 446 is run on the processor 416 to keep track of the number of events associated with the advertisement. Periodically (e.g., monthly, quarterly, etc.), invoice data 448 is generated comprising the number of events associated with the advertisement (e.g., in a given time period or invoicing interval), the CPE for the advertisement, and the total cost of the advertisements for the period. An invoice 450 is then transmitted to the vendor. When the vendor pays the amount due on the invoice, a portion of the payment is provided to the financial institution, and the remainder is retained by the provider of the advertisement placement service (e.g., the server owner).

Figure 14:
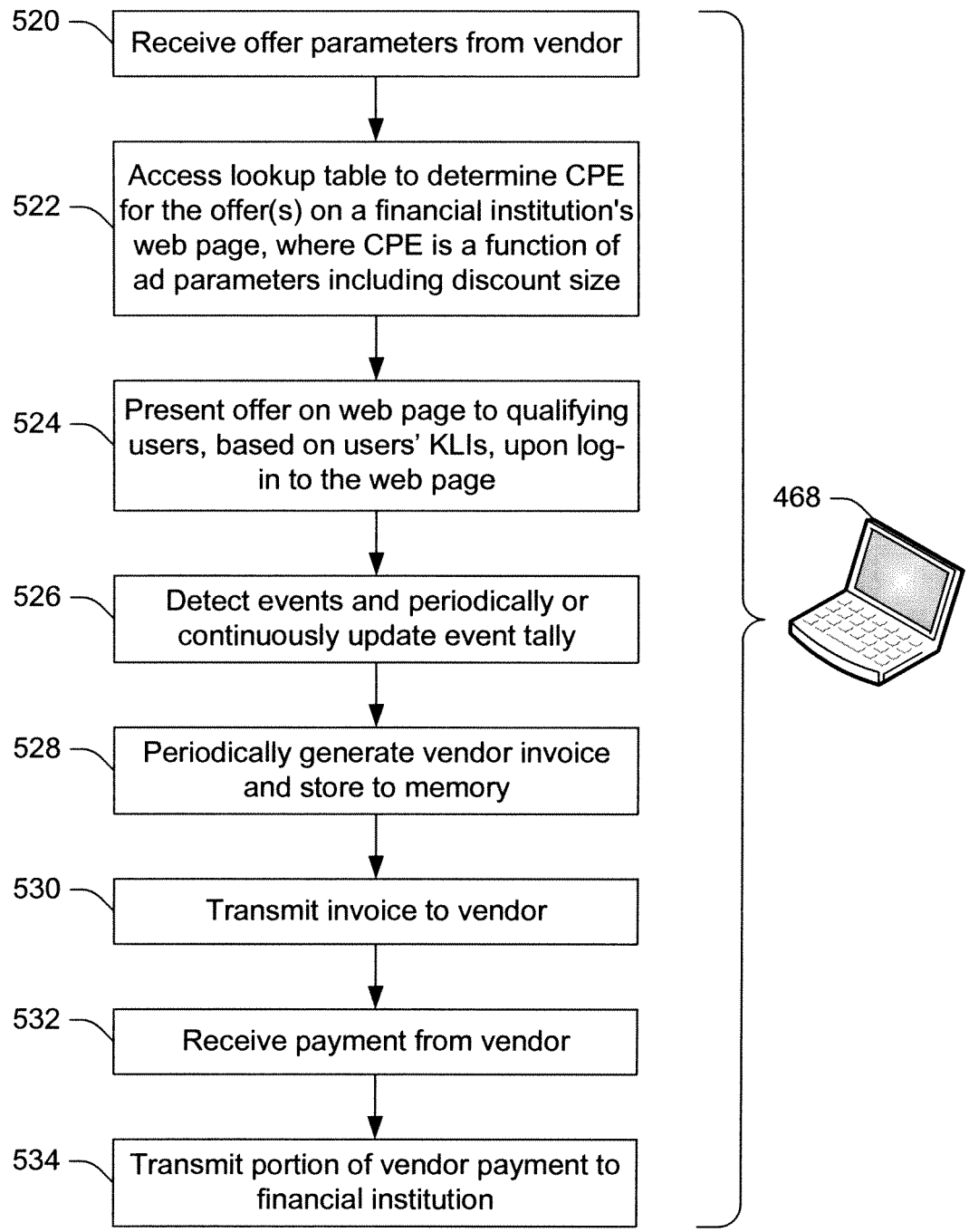
FIG. 14 illustrates a method of providing the service described with regard to FIG. 13, in accordance with various aspects described herein.

FIG. 14 illustrates a method of providing the service described with regard to FIG. 13, in accordance with various aspects described herein. One or more of the steps of the method described with regard to FIG. 14 may be implemented on a computer 468. At 520, offer parameter information is received (e.g., at an advertisement placement service or provider) from a vendor. At 522, a CPE lookup table is accessed to identify a cost per event for the offer on a financial institution's website. The CPE is a function of the offer parameters, including the size of the discount offered, the type of event specified by the vendor (e.g., click, purchase, ad presentation, competed form, etc.). For instance, a larger discount has a lower CPE than a smaller discount for the same item or service. At 524, the offer is presented to qualifying financial institution customers when they log on to the financial institution's website. Customer qualification is determined by comparing vendor-specified target customer criteria to KLIs in a customer profile stored in a financial institution database for the customer. At 526, the vendor-specified event is detected and a tally of the number of times the event occurs is updated (e.g., periodically or continuously). Periodically, a vendor invoice is generated, at 528. The invoice is transmitted to the vendor at 530. Payment is received from the vendor at 532. A predetermined portion of the vendor's payment is then provided to the financial institution, at 534. In this manner, the financial institution receives a payment for permitting the advertisement to be displayed on its website, and may accept a smaller payment per event associated with advertisements displayed in exchange for larger discounts for its customers. The vendor is incentivized to provide larger discounts to entice customers to click on the advertisement, and the financial institution is incentivized to charge less per advertisement display in order to provide larger discounts to its visitors or customers, which in turn increases the likelihood of future visits to the financial institution website (i.e., increased website traffic).

The methods illustrated in FIGS. 12 and 14 may be implemented in a computer program product that may be executed on a computer 468 or computing components (e.g., server 414, processor 416, memory 418, etc.) in the system of FIGS. 11 and 13. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 416 of FIGS. 11 and 13, a system memory such as the memory 418 of FIGS. 11 and 13, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Methods and systems for providing targeted content to specific customers while reducing advertisement cost to a vendor in exchange for increased discounts for the customer have been described with reference to specific embodiments. Modifications and alterations will occur to those upon reading and understanding the preceding detailed description. For example, the methods and systems described above can also be used to deliver targeted content—content that is not an advertisement—to consumers based on the above described classification and transactional metrics. The invention is not limited to only those embodiments described above. Instead, the invention is intended to cover all modifications and alterations that come within the scope of the appended claims and the equivalents thereof.

The invention claimed is:

1. A method of presenting targeted advertisements to qualified customers while providing a scalable, discount-dependent cost structure to a vendor placing the advertisements, comprising:
   receiving offer parameters from a vendor including a minimum number of vendor-specified key lifestyle indicators (KLIs) which the vendor has indicated to be associated with a target customer, and a weight assigned to one or more desired KLIs;
   accessing a cost-per-event (CPE) lookup table (LUT) that includes pricing information for each instance of a predefined event associated with an advertisement according to the offer parameters;
   identifying, via a processor, qualified customers by matching, via a processor, key lifestyle indicators (KLIs) associated with an advertisement delivery identification code (ADIC) that corresponds to a unique customer identification code (UCIC) assigned by the financial institution, each UCIC being associated with a given customer's financial account and transaction information and not traceable back to the customer, wherein the KLIs associated with the ADIC describe the customer and are inferred via the processor from at least one of anonymized financial institution account information and anonymized financial institution transaction information received from a financial institution and associated with the UCIC assigned by the financial institution to the customer, in an anonymized customer profile to target customer KLIs specified by the vendor in the offer parameters, wherein the matching is based at least in part on the weight associated with each of the desired KLIs;
   presenting the advertisement to qualified customers when the qualified customers log on to a predetermined website and upon detection of a cookie, which is anonymous and does not reveal the identity of the customer stored on a computer of each respective qualified customer, wherein the cookie comprises an ADIC associated with a given customer;
   tallying a number of advertisement-associated events that occur within a predetermined time period; and
   periodically generating an invoice comprising the tally of events, the CPE for the events, and a total cost of the advertisements; and
   adjusting the CPE for the events as a function of a size of an offer or discount presented in the advertisement and specified by the vendor in the offer parameters.

2. The method of claim 1, wherein the offer parameters further include information describing:
   one or more of an item and a service being offered;
   an expiration date for the offer; and
   one or more other terms of the offer.

3. The method of claim 1, wherein the cost per event is inversely proportional to a size of the discount presented in the advertisement.

4. The method of claim 1, wherein the event is a predetermined number of presentations of the advertisement to qualified customers.

5. The method of claim 1, wherein the event is a predetermined number of clicks on the advertisement by qualified customers.

6. The method of claim 1, further comprising transmitting the invoice to the vendor, receiving payment from the vendor, and remitting a portion of the received payment to an owner of the website on which the advertisements are placed.

7. The method of claim 6, wherein the website is a financial institution website, and further including remitting the portion of the received payment to the financial institution.

8. The method of claim 1, wherein the CPE LUT correlates discount values to CPEs, such that advertisements offering higher discounts have lower CPEs.

9. A non-transitory computer-readable medium having stored thereon computer-executable instructions for presenting targeted advertisements to qualified customers while providing a scalable, discount-dependent cost structure to a vendor placing the advertisements, the instructions comprising:
   receiving offer parameters from a vendor including a minimum number of vendor-specified key lifestyle indicators (KLIs) which the vendor has indicated to be associated with a target customer, and a weight assigned to one or more desired KLIs;
   accessing a cost-per-event (CPE) lookup table (LUT) that includes pricing information for each instance of a predefined event associated with an advertisement according to the offer parameters;
   identifying qualified customers by matching, via a processor, key lifestyle indicators (KLIs), associated with an advertisement delivery identification code (ADIC) that corresponds to a unique customer identification code (UCIC) assigned by the financial institution, each UCIC being associated with a given customer's financial account and transaction information and not traceable back to the customer, wherein the KLIs associated with the ADIC describe the customer and are inferred via the processor from at least one of anonymized financial institution account information and anonymized financial institution transaction information received from a financial institution and associated with the UCIC assigned by the financial institution to the customer, in an anonymized customer profile to target customer KLIs specified by the vendor in the offer parameters, wherein the matching is based at least in part on the weight associated with each of the desired KLIs;
   presenting the advertisement to qualified customers when the qualified customers log on to a predetermined website and upon detection of a cookie, which is anonymous and does not reveal the identity of the customer, wherein the cookie comprises an ADIC associated with a given customer;
   tallying the number of advertisement-associated events that occur within a predetermined time period; and
   periodically generating an invoice comprising the tally of events, the CPE for the events, and a total cost of the advertisements; and
   adjusting the CPE for the events as a function of the size of an offer or discount presented in the advertisement and specified by the vendor in the offer parameters.

10. A system that facilitates presenting targeted advertisements to qualified customers while providing a scalable, discount-dependent cost structure to a vendor placing the advertisements, comprising:
   a server that is coupled to each of a vendor user interface (UI), a third party website, and a customer user interface, and which includes a processor that executes, and a memory that stores, computer-executable instructions, the instructions including:

receiving offer parameters from a vendor user interface (UI), the offer parameters including information related to an offer to be presented on the third party website, a minimum number of vendor-specified key lifestyle indicators (KLIs) which the vendor has indicated to be associated with a target customer, and a weight assigned to one or more desired KLIs;

generating an advertisement describing the offer based on the offer parameters;

matching customer profile key lifestyle indicators (KLIs), associated with an advertisement delivery identification code (ADIC) that corresponds to a unique customer identification code (UCIC) assigned by the financial institution, each UCIC being associated with a given customer's financial account and transaction information and not traceable back to the customer, wherein the KLIs associated with the ADIC describe the customer and are inferred from at least one of anonymized financial institution account information and anonymized financial institution transaction information received from a financial institution and associated with the UCIC assigned by the financial institution to the customer, to target customer criteria specified in the offer parameters to identify qualified customers, wherein the matching is based at least in part on the weight associated with each of the desired KLIs;

presenting the advertisement on the third party website to the qualified customers when the qualified customers log on to the third party website and upon detection of a cookie, which is anonymous and does not reveal the identity of the customer stored on a computer of each respective qualified customer, wherein the cookie comprises an ADIC associated with a given customer;

tallying a number of advertisement events that occur within a predetermined time period;

determining a cost per event (CPE) related to advertisement presentations for the advertisement by performing a table lookup on a CPE lookup table (LUT) that correlates CPEs to discount values; and generating an invoice for the vendor that describes the tally of events for the advertisement, the CPE for the advertisement, and a total cost for the advertisement;

adjusting the CPE as a function of a size of an offer or discount by the vendor for an item or service described in the offer parameters.

11. The system of claim 10, wherein the offer parameters further include information describing one or more of:

an item and a service being offered;

an expiration date of the offer; and a permitted number of acceptances of the offer.

12. The system of claim 10, wherein the cost per event is inversely proportional to the size of the discount presented in the advertisement.

13. The system of claim 10, wherein the event is a predetermined amount of revenue generated as a result of the advertisement from qualified customers.

14. The system of claim 10, wherein the event is a predetermined number of clicks on the advertisement by qualified customers.

15. The system of claim 10, wherein the server transmits the invoice to the vendor, receives payment from the vendor, and remits a portion of the received payment to an owner of the website on which the advertisements are placed.

16. The system of claim 15, wherein the website is a financial institution website, and wherein the server remits the portion of the received payment to the financial institution.

17. The system of claim 10, wherein the CPE LUT correlates discount values to CPEs, such that advertisements offering higher discounts have lower CPEs.

18. The system of claim 10, wherein the event is the occurrence of a predetermined number of presentations of the advertisement to qualified customers.

19. The system of claim 18, wherein the predefined number is 1000.

* * * * *